United States Patent
Kojima et al.

(10) Patent No.: US 6,327,522 B1
(45) Date of Patent: Dec. 4, 2001

(54) DISPLAY APPARATUS FOR VEHICLE

(75) Inventors: Koichi Kojima; Hiroki Uemura; Hidekazu Sasaki; Ayumu Doi, all of Hiroshima-ken (JP)

(73) Assignee: Mazda Motor Corporation, Hiroshima-ken (JP)

( * ) Notice: Subject to any disclaimer, the term of this patent is extended or adjusted under 35 U.S.C. 154(b) by 0 days.

(21) Appl. No.: 09/596,860

(22) Filed: Jun. 19, 2000

(30) Foreign Application Priority Data

Sep. 7, 1999 (JP) .................................................. 11-253309
Sep. 7, 1999 (JP) .................................................. 11-253310
Sep. 7, 1999 (JP) .................................................. 11-253313

(51) Int. Cl.[7] ................................. G09G 5/00; G06G 7/78
(52) U.S. Cl. ............................. 701/1; 701/96; 701/300; 348/115
(58) Field of Search .............................. 701/1, 96, 300, 701/301, 28; 340/903, 937, 943, 435, 436; 348/115, 118, 119

(56) References Cited

U.S. PATENT DOCUMENTS

| | | | |
|---|---|---|---|
| 4,833,469 | * | 5/1989 | David ................................. 340/901 |
| 5,646,639 | * | 7/1997 | Koie ....................................... 345/7 |
| 5,661,454 | * | 8/1997 | Bezard et al. ...................... 340/461 |
| 5,793,308 | * | 8/1998 | Rosinski et al. ................... 340/903 |
| 5,821,867 | * | 10/1998 | Angell et al. .................. 340/815.45 |
| 5,883,739 | * | 3/1999 | Ashihara et al. ................... 359/462 |
| 5,983,161 | * | 11/1999 | Lemelson et al. .................. 701/301 |
| 6,014,608 | * | 1/2000 | Seo ...................................... 701/207 |
| 6,072,391 | * | 6/2000 | Suzuki ................................ 340/468 |
| 6,108,031 | * | 8/2000 | King et al. .......................... 348/118 |

FOREIGN PATENT DOCUMENTS

| | | |
|---|---|---|
| 60231193 | 11/1985 | (JP) . |
| 6247184 | 9/1994 | (JP) . |
| 10148537 | 6/1998 | (JP) . |
| 10230805 | 9/1998 | (JP) . |

* cited by examiner

*Primary Examiner*—Tan Nguyen
*Assistant Examiner*—Dalena Tran
(74) *Attorney, Agent, or Firm*—Brooks & Kushman P.C.

(57) ABSTRACT

In a display apparatus for a vehicle, when an auto mode is selected, an obstacle closest to the vehicle is determined on the basis of data that represents an output signal from an obstacle sensor, the determined obstacle and a radiation heat source (pixel group) included in an image sensed by an infrared light camera are associated with each other, and only an image corresponding to the obstacle closest to the vehicle is displayed on a display (FIG. 2, S5–S7).

18 Claims, 31 Drawing Sheets

F I G. 8
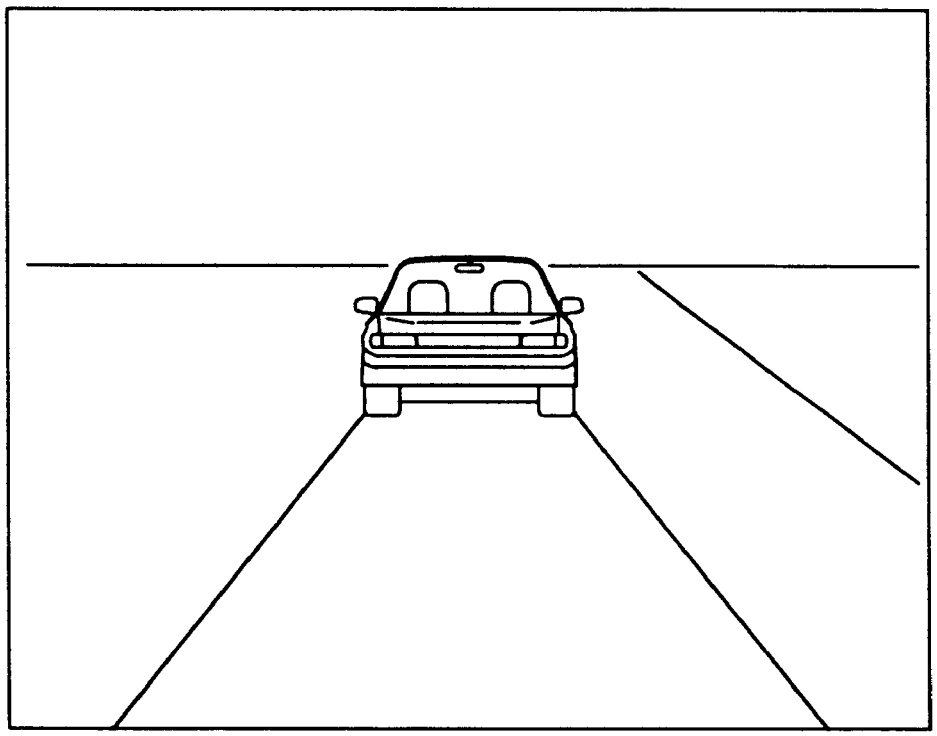

FIG. 22
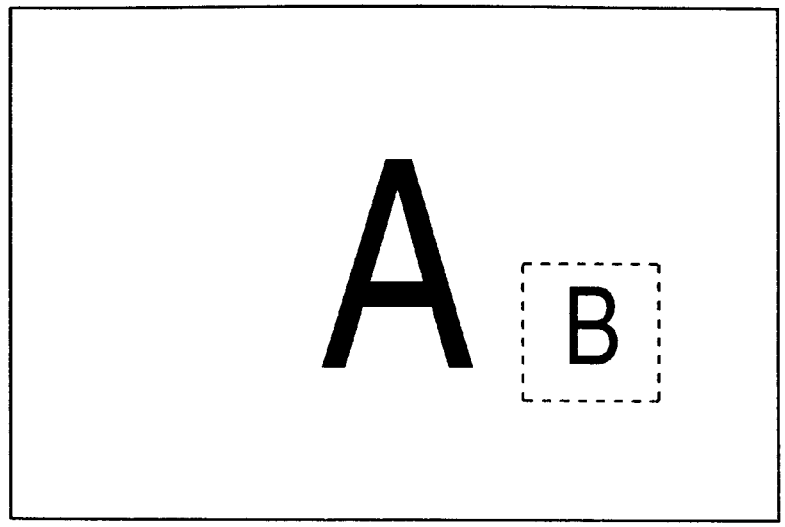
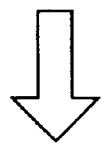
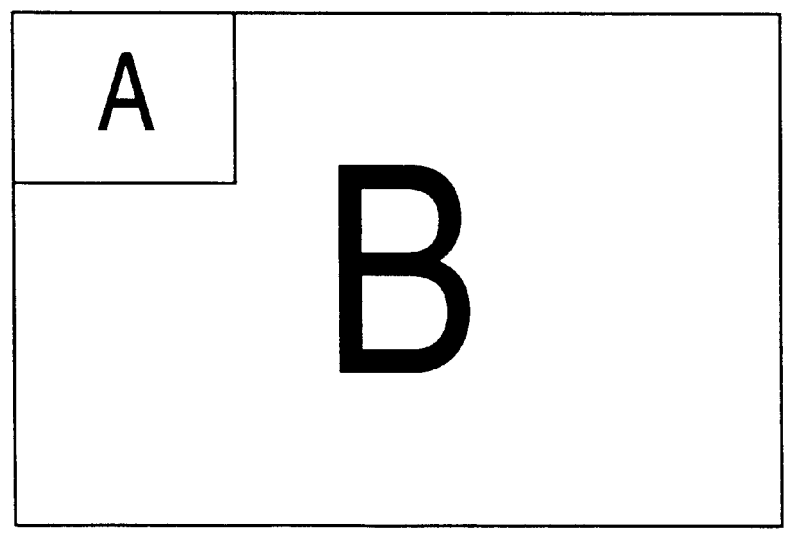

WHEN DRIVER GAZES FORWARD

WHEN DRIVER LOOKS ASIDE

DISPLAY APPARATUS FOR VEHICLE

FIELD OF THE INVENTION

The present invention relates to a display apparatus for a vehicle and, for example, to a display apparatus which is suitably mounted on an automobile as a representative vehicle.

BACKGROUND OF THE INVENTION

Conventionally, a technique for displaying an image ahead of a vehicle, which is sensed using infrared rays, on a display provided in front of a driver's seat so as to assist driving of a driver in a maneuvering environment with poor visibility such as nighttime, heavy fog, or the like has been proposed in, e.g., Japanese Patent Laid-Open Nos. 60-231193, 6-247184, 10-230805, or the like.

The display apparatuses proposed by these prior arts can effectively assist driver's vision.

However, when the sensed infrared ray image includes a plurality of obstacles, it is difficult for the driver to recognize the distances between the individual obstacles and his or her vehicle. For this reason, it is hard to determine an obstacle which the driver must watch out most, and such display may often have adverse influences on the driving of the driver.

When a far obstacle is sensed, its image is displayed to have a small size in the infrared ray image. For this reason, the driver cannot recognize the obstacle displayed on the display screen at a glance, and such image cannot effectively assist driver's vision.

When the sensed infrared ray image is always displayed irrespective of the maneuvering environment, such display may have adverse influences on the driving of the driver.

SUMMARY OF THE INVENTION

The present invention has been made in consideration of the aforementioned conventional problems, and has as its object to provide a display apparatus for a vehicle, which can display an obstacle which the driver must watch out, so that the driver can easily recognize the displayed image.

In order to achieve the above object, a display apparatus for a vehicle according to the present invention is characterized by the following arrangement.

That is, a display apparatus for a vehicle of a present invention is a display apparatus for a vehicle, which is provided to a vehicle, and comprises an image sensing device (3, 23, 43) for sensing an image of a landscape ahead of the vehicle using infrared rays, a display (8, 28, 48) for displaying the image sensed by the image sensing device at a position in front of a driver's seat of the vehicle, and distance detection means (2, 22, 42) for detecting an obstacle present ahead of the vehicle, and detecting a distance between the obstacle and the vehicle, characterized by comprising display control means (1, 21, 41) for changing a display mode of the display in accordance with a detection result of the distance detection means.

In a preferred embodiment of the display apparatus for a vehicle of the present invention, preferably, the display control means (1) computes distances to obstacles contained in the image sensed by the image sensing device (3) on the basis of that image and the detection result from the distance detection means (2), executes a predetermined image processing of the image so as to display only the obstacle with the shortest computed distance to the vehicle, and displays an image that has undergone the image processing on the display (8).

In a preferred embodiment of the display apparatus for a vehicle of the present invention, preferably, the display control means (1) computes distances to obstacles contained in the image sensed by the image sensing device (3) on the basis of that image and the detection result from the distance detection means (2), executes a predetermined image processing of the image so as to emphasize and display the obstacle with the shortest computed distance to the vehicle compared to other obstacles, and displays an image that has undergone the image processing on the display.

Furthermore, in the apparatus arrangement, the display control means preferably executes the following processing as the predetermined processing:

a processing for changing contrast between a partial image that represents the obstacle closest to the vehicle, and a surrounding image thereof;

a processing for setting a display color of a partial image that represents the obstacle closest to the vehicle to be different from a display color of a partial image that represents another obstacle;

a processing for setting a luminance of a partial image that represents the obstacle closest to the vehicle to be higher than a luminance of a partial image that represents another obstacle; or a processing for emphasizing and displaying an outline of a partial image that represents the obstacle closest to the vehicle.

In a preferred embodiment of the display apparatus for a vehicle of the present invention, preferably, the display control means (1) computes distances to obstacles contained in the image sensed by the image sensing device (3) on the basis of that image and the detection result from the distance detection means (2), extracts a partial image that represents the obstacle with the shortest distance to the vehicle, executes a predetermined image processing for enlarging the extracted image, and displays an image that has undergone the image processing on the display (8).

In a preferred embodiment of the display apparatus for a vehicle of the present invention, preferably, the display control means (1) extracts a partial image that represents a person from an overall image sensed by the image sensing device (3), computes a distance between the vehicle and the person corresponding to the partial image on the basis of the overall image and the detection result from the distance detection means (2), executes a predetermined image processing of the overall image so as to emphasize and display the partial image that represents the person with the shortest computed distance to the vehicle compared to partial images representing other obstacles, and displays an image that has undergone the image processing on the display (8).

In a preferred embodiment of this apparatus arrangement, preferably, the display control means determines an obstacle, a radiation temperature of which falls within a predetermined temperature range, to be a person on the basis of radiation temperatures of obstacles included in the overall image, prior to extraction of the partial image that represents the person from the overall image.

More preferably, the apparatus arrangement further comprises maneuvering environment detection means (4, 5) for detecting a maneuvering environment of the vehicle, and the display control means corrects the predetermined temperature range in accordance with the maneuvering environment detected by the maneuvering environment detection means. More specifically, the following processing is preferably done:

the maneuvering environment detection means (5) detects as the maneuvering environment an atmospheric temperature of the vehicle, and the display control means shifts the predetermined temperature range toward higher temperature with increasing atmospheric temperature detected by the maneuvering environment detection means; or the maneuvering environment detection means (5) detects as the maneuvering environment calendar information or time information, and the display control means corrects the predetermined temperature range on the basis of the calendar information or time information detected by the maneuvering environment detection means.

Alternatively, as the emphasized display mode in the display apparatus for a vehicle of the present invention, the display control means preferably makes the following display as the predetermined image processing:

to change contrast between a partial image that represents the person closest to the vehicle, and a surrounding image thereof;

to set a display color of a partial image that represents the person closest to the vehicle to be different from a display color of a partial image that represents another obstacle;

to set a luminance of a partial image that represents the person closest to the vehicle to be higher than a luminance of a partial image that represents another obstacle as the predetermined image processing;

to emphasize and display an outline of a partial image that represents the person closest to the vehicle; or to select a predetermined number of distances which are computed between the vehicle and persons corresponding to the partial images in ascending order of distance to the vehicle, and emphasize and display the partial images that represent the persons corresponding to the selected distances compared to the partial images that represent the other obstacles, as the predetermined image processing.

In a preferred embodiment of the display apparatus for a vehicle of the present invention, preferably, the display control means (1) extracts partial images that represent persons from an overall image sensed by the image sensing device (3), computes distances between the vehicle and the persons corresponding to the partial images on the basis of the overall image and the detection result from the distance detection means (2), and displays the partial image that represents the person with the shortest computed distance to the vehicle on the display, and also the computed distance to the vehicle in association with that person near the partial image.

In a preferred embodiment of the display apparatus for a vehicle of the present invention, preferably, the display control means (1) computes distances between the vehicle and obstacles included in the image sensed by the image sensing device (3) on the basis of that image and the detection result from the distance detection means (2), displays a partial image which represents the obstacle with the shortest computed distance to the vehicle on the display (8), and also displays the distance to the vehicle computed in association with that obstacle near the partial image.

In a preferred embodiment of the display apparatus for a vehicle of the present invention, preferably, the display control means (1) computes distances between the vehicle and obstacles included in the overall image sensed by the image sensing device (3) on the basis of that overall image and the detection result from the distance detection means (2), extracts a partial image that represents a corresponding obstacle when each of the computed distances is larger than a first predetermined distance, executes a predetermined image processing for enlarging the extracted partial image, and displays an image that has undergone the image processing on the display (8).

In the aforementioned apparatus arrangement, the apparatus preferably further comprises vehicle velocity detection means (24) for detecting a vehicle velocity of the vehicle, and the display control means (21) makes enlarged-scale display of the partial image easier with increasing vehicle velocity of the vehicle upon executing the predetermined image processing.

More preferably, the display control means makes enlarged-scale display of the partial image easier by increasing the first predetermined distance with increasing vehicle velocity of the vehicle; or the apparatus further comprises turn state detection means (25) for detecting a turn state of the vehicle, and the display control means (21) inhibits execution of enlarged-scale display of the partial image when the turn state detection means detects that the vehicle is turning.

Alternatively, the apparatus preferably further comprises turn state detection means (25) for detecting a turn state of the vehicle, and when the turn state detection means detects that the vehicle is turning and it is determined that an obstacle located at a position closer than the first predetermined distance is approaching along an estimated route of the vehicle, the display control means (21) makes enlarged-scale display of a partial image which represents that obstacle, and when the turn state detection means detects that the vehicle is not turning, the display control means inhibits execution of enlarged-scale display of the partial image.

Alternatively, the first predetermined distance is preferably set at a possible irradiation distance of head lamps of the vehicle in the display control means.

Alternatively, the display control means preferably also displays a symbol mark which informs a passenger of enlarged-scale display when the partial image is displayed in an enlarged scale.

Alternatively, the apparatus preferably further comprises maneuvering environment detection means (31–33) for detecting a maneuvering environment of the vehicle, and the display control means (21) corrects the first predetermined distance in accordance with the maneuvering environment detected by the maneuvering environment detection means.

As a preferred embodiment adopted upon correcting the first predetermined distance in correspondence with the maneuvering environment, the following processing is preferably done:

the maneuvering environment detection means (31, 32) detects a value that pertains to visibility of a driver with respect to a maneuvering environment ahead of the vehicle as the maneuvering environment, and the display control means corrects the first predetermined distance to increase as the detection result of the maneuvering environment detection means indicates worse visibility.

Alternatively, the maneuvering environment detection means (31) detects a wiper operation speed of the vehicle as the maneuvering environment, and the display control means corrects the first predetermined distance to increase with increasing wiper operation speed detected by the maneuvering environment detection means.

Alternatively, the maneuvering environment detection means (31) detects an ON/OFF state of fog lamps of the vehicle as the maneuvering environment, and the display control means corrects the first predetermined distance to increase when the fog lamps are ON than a value when the fog lamps are OFF.

In a preferred embodiment of the apparatus arrangement that displays the extracted partial image in an enlarged scale, preferably, the apparatus further comprises a manual switch (37) which can inhibit execution of enlarged-scale display by the display control means (21); or the display control means (21) superimposes an enlarged-scale image of the partial image on the overall image as the predetermined image processing.

In a preferred embodiment of the display apparatus for a vehicle of the present invention, preferably, the display control means (21) computes distances between the vehicle and obstacles included in an overall image sensed by the image sensing device (23) on the basis of that overall image and the detection result from the distance detection means (22), displays an image obtained by deforming a partial image that represents a given obstacle on the display (28) when the computed distance to that obstacle is larger than a first predetermined distance, so as to make a driver easily recognize the presence of the corresponding obstacle, and displays the overall image on the display when the computed distance is smaller than the first predetermined distance.

In a preferred embodiment of the display apparatus for a vehicle of the present invention, preferably, the display control means (41) computes distances between the vehicle and obstacles included in an overall image sensed by the image sensing device (43) on the basis of that overall image and the detection result from the distance detection means (42), displays the overall image on the display (48) when the computed distance is smaller than a second predetermined distance, and stops display of the overall image on the display when the computed distance is larger than the second predetermined distance.

In this case, the following arrangement is preferably used:

the apparatus further comprises vehicle velocity detection means (45) for detecting a vehicle velocity of the vehicle, and the display control means changes the second predetermined distance to increase with increasing vehicle velocity of the vehicle.

Alternatively, the apparatus preferably further comprises maneuvering environment detection means (46, 53) for detecting a maneuvering environment of the vehicle, and the display control means corrects the second predetermined distance in accordance with the maneuvering environment detected by the maneuvering environment detection means.

When the second predetermined distance is corrected in correspondence with the maneuvering environment, the following arrangement is adopted more preferably:

the maneuvering environment detection means (46, 53) detects a value that pertains to visibility of a driver with respect to a maneuvering environment ahead of the vehicle as the maneuvering environment, and the display control means corrects the second predetermined distance to increase as the detection result of the maneuvering environment detection means indicates worse visibility.

More specifically, preferably, the maneuvering environment detection means (46) detects a wiper operation speed of the vehicle as the maneuvering environment, and the display control means corrects the second predetermined distance to increase with increasing wiper operation speed detected by the maneuvering environment detection means; or the maneuvering environment detection means (53) detects an ON/OFF state of fog lamps of the vehicle as the maneuvering environment, and the display control means corrects the second predetermined distance to increase when the fog lamps are ON than a value when the fog lamps are OFF.

Upon controlling whether or not the entire image is displayed on the display (48) in accordance with the comparison result between the computed distance and the second predetermined distance, the apparatus preferably further comprises alert means (50) for informing a passenger of start of display by means of a voice message prior to display of the overall image.

In this case, more preferably, the display control means corrects a delay time from an alert generation timing by the alert means until the start of display of the overall image on the display to be a time which decreases with decreasing distance computed for the obstacle; or the apparatus further comprises vehicle velocity detection means (45) for detecting a vehicle velocity of the vehicle, and the display control means corrects a delay time from an alert generation timing by the alert means until the start of display of the overall image on the display to be a time which decreases with increasing vehicle velocity of the vehicle.

According to the present invention, even when a plurality of obstacles are found, the driver can easily recognize an obstacle which he or she must watch out.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 8 shows a display example in the second embodiment (when one obstacle is present);

FIG. 22 shows an example of a reduced-scale image of an infrared ray image, and an enlarged-scale image of an obstacle, which are displayed at the same time;

DETAILED DESCRIPTION OF THE PREFERRED EMBODIMENTS

Preferred embodiments to which a display apparatus for a vehicle according to the present invention is applied to an automobile as a representative vehicle will be described in detail hereinafter with reference to the accompanying drawings.

[First Embodiment]

Figure 1:
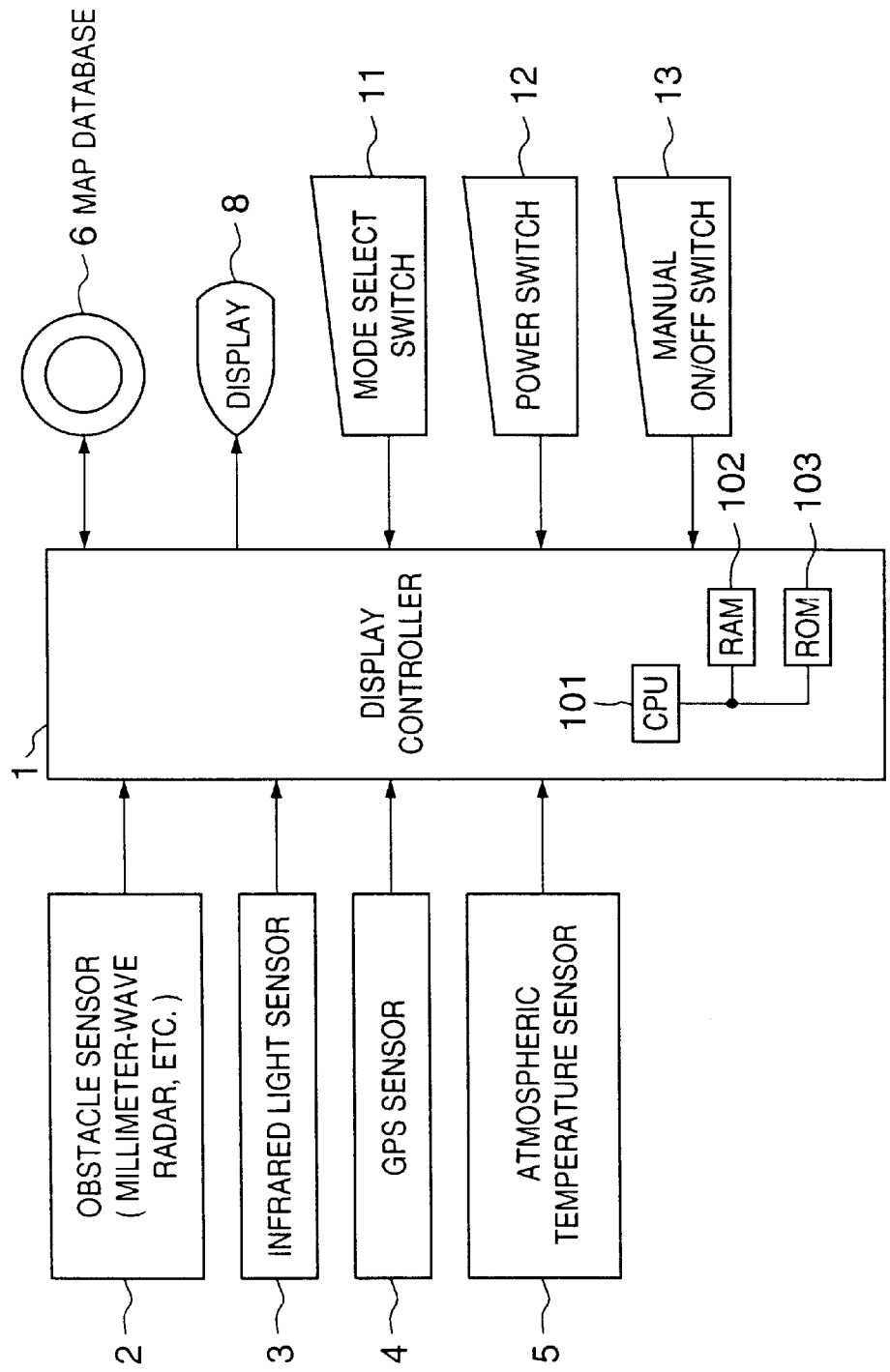
FIG. 1 is a block diagram of a display apparatus for a vehicle according to the first embodiment of the present invention.

FIG. 1 is a block diagram of a display apparatus for a vehicle according to the first embodiment of the present invention.

Referring to FIG. 1, reference numeral 2 denotes an obstacle sensor such as a CCD (Charge Coupled Device) camera, laser radar, or millimeter-wave radar, or the like for detecting the distance to an obstacle ahead of the vehicle by a general method. Reference numeral 3 denotes an infrared light (infrared ray) camera using an environment ahead of the vehicle using infrared rays.

Reference numeral 4 denotes a GPS (global positioning system) sensor for externally receiving a GPS signal used upon computing the current position of the vehicle. Reference numeral 5 denotes an atmospheric temperature sensor for detecting the temperature outside the passenger room of the vehicle. Reference numeral 6 denotes a map database from which data such as road map information or the like can be read out.

Reference numeral 8 denotes a display such as a liquid crystal display, head-up display, or the like for displaying an image sensed by the infrared light camera 3 (to be referred to as a sensed image hereinafter). Note that the display 8 is preferably laid out at a position (e.g., near the central position of a dashboard, or the like) in front of the driver's seat of the vehicle where the driver can easily see the displayed image without largely moving the line of sight when he or she looks forward.

Reference numeral 11 denotes a mode select switch which allows the operator to select a display mode of a sensed image on the display 8. The display mode that can be selected by this switch includes a manual mode which directly displays a sensed image output from the infrared light camera 3 on the display 8 without any modifications while the operator holds a manual ON/OFF switch 13 ON, and an auto mode which displays an image processed by a display control processing (to be described later) on the display 8, when the auto mode is selected by the mode select switch 11.

Reference numeral 12 denotes a power switch which allows the operator to turn on/off power supply to a display controller 1.

The manual ON/OFF switch 13 is used to display the sensed image output from the infrared light camera 3 on the display 8 without any modifications while the operator holds this switch ON when the manual mode is selected by the mode select switch 11.

The display controller 1 controls display of the sensed image output from the infrared light camera 3 on the display 8 on the basis of output signals (data corresponding to the output signals) from the respective sensors, and the detected operation states of the operation switches, as will be described in detail later.

The display control processing of the display controller 1 is executed by a CPU 101 in accordance with software pre-stored in a ROM 103 or the like while using a RAM 102 as a work area.

An example of the display control processing done by the display controller 1 in this embodiment will be described below with reference to FIGS. 2 to 5.

Figure 2:
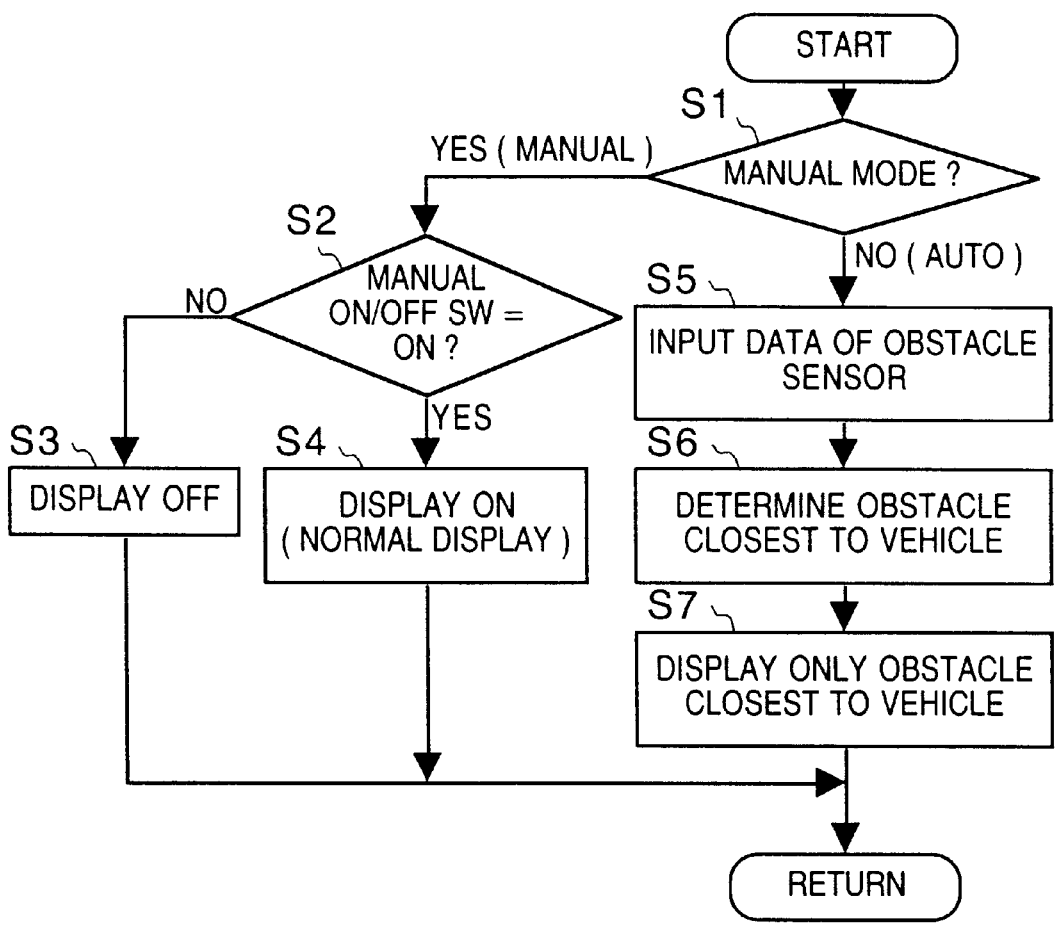
FIG. 2 is a flow chart of a display control processing by the display apparatus for a vehicle according to the first embodiment.

FIG. 2 is a flow chart of the display control processing by the display apparatus for a vehicle according to the first embodiment. FIG. 2 shows the sequence of software executed by the CPU 101 while the ignition key switch of the vehicle is ON, and the power switch 12 is ON.

Step S1 in FIG. 2: The CPU 101 detects the operation state of the mode select switch 11 to check if the manual mode is selected. If YES (manual mode) in step S1, the flow advances to step S2; if NO (auto mode) in step S1, the flow advances to step S5.

Steps S2 to S4: In the current state wherein the manual mode is selected, the CPU 101 checks if the manual ON/OFF switch 13 is ON. If NO (switch 13: OFF) in step S2, the CPU 101 turns off display of the sensed image on the display 8 (step S3); if YES (switch 13: ON) in step S2, the CPU 101 starts or continues display of an image sensed by the infrared ray camera 3 (i.e., an infrared ray image which does not undergo any processing in the auto mode to be described later: see a display example shown in FIG. 3) (step S4).

Step S5: Since the auto mode is selected, the CPU 101 loads data corresponding to the output signal from the obstacle sensor in this step.

Step S6: The CPU 101 determines an obstacle located at a position closest to the vehicle on the basis of the data which is loaded in step S5 and corresponds to the output signal from the obstacle sensor 2, and the sensed image output from the infrared light sensor 3.

An example of the method of detecting the closest obstacle in step S6 will be explained below.

Figure 3:
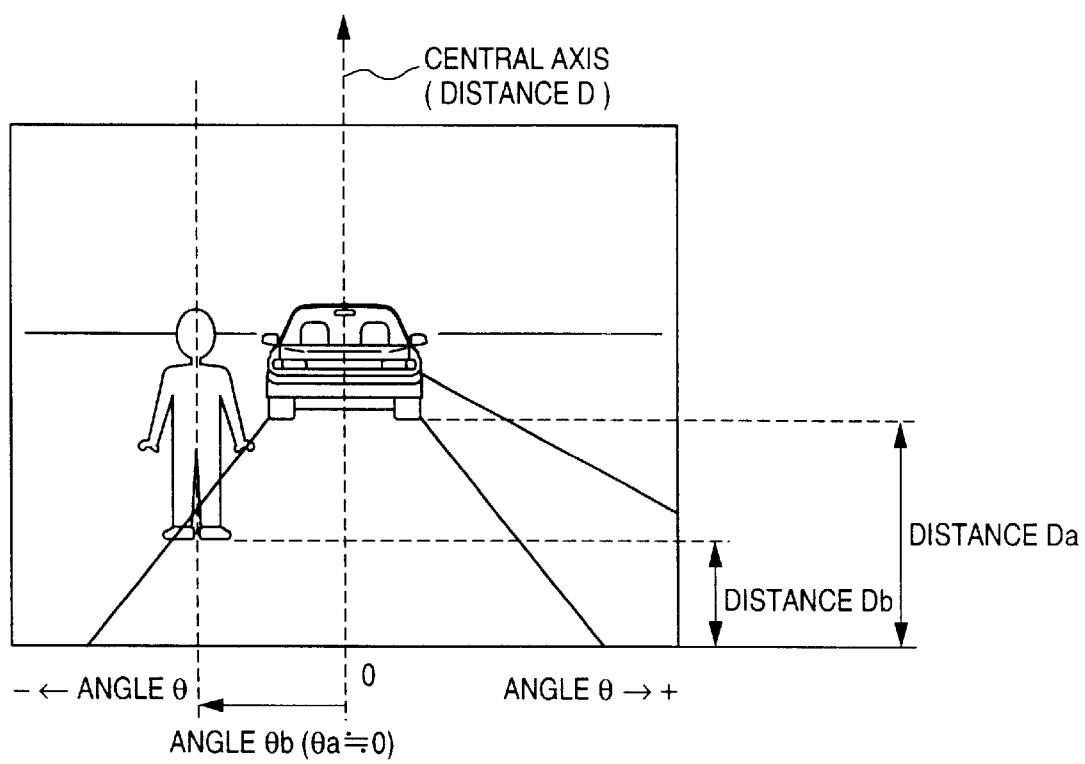
FIG. 3 shows an example of an image sensed by an infrared ray camera (normal display mode)
Figure 4:
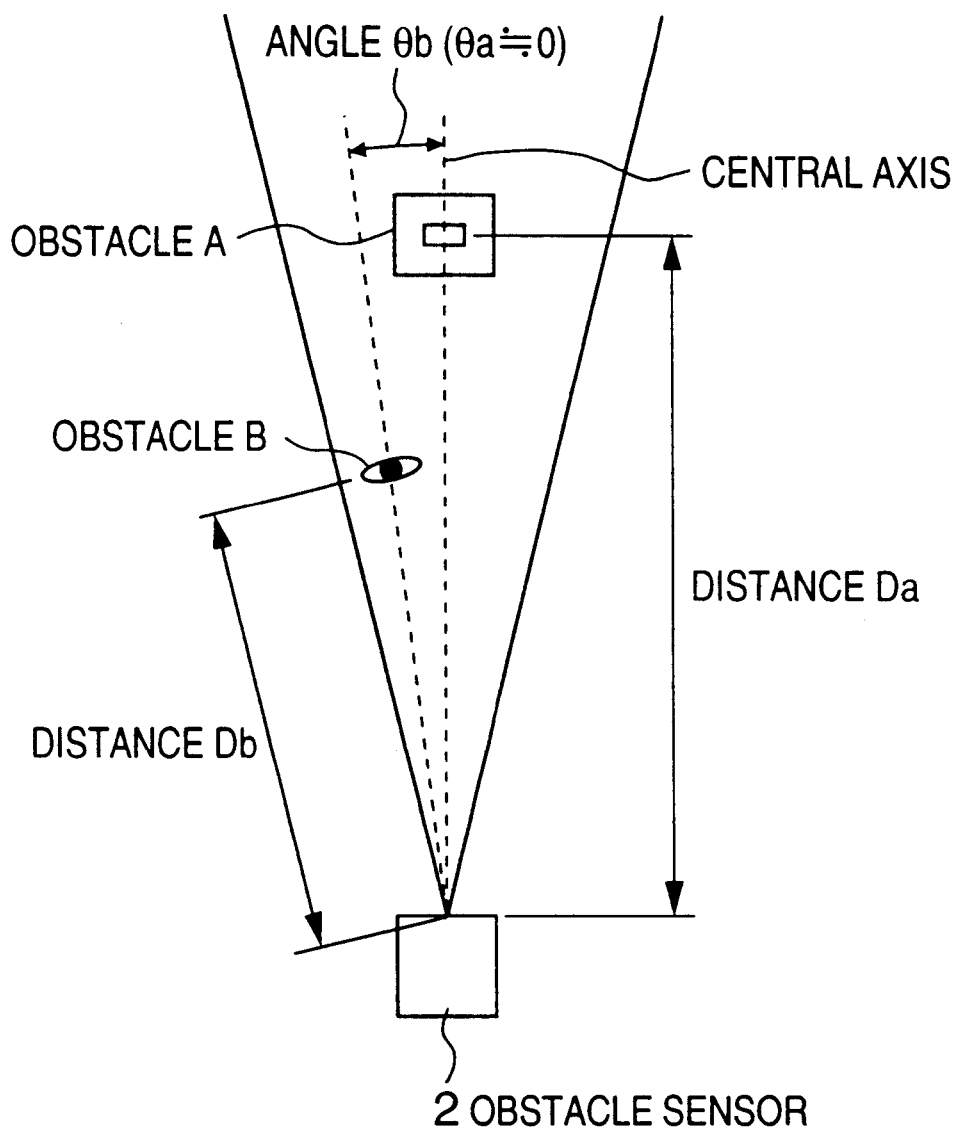
FIG. 4 is a top view of the detection range of an obstacle sensor 2.
Figure 5:
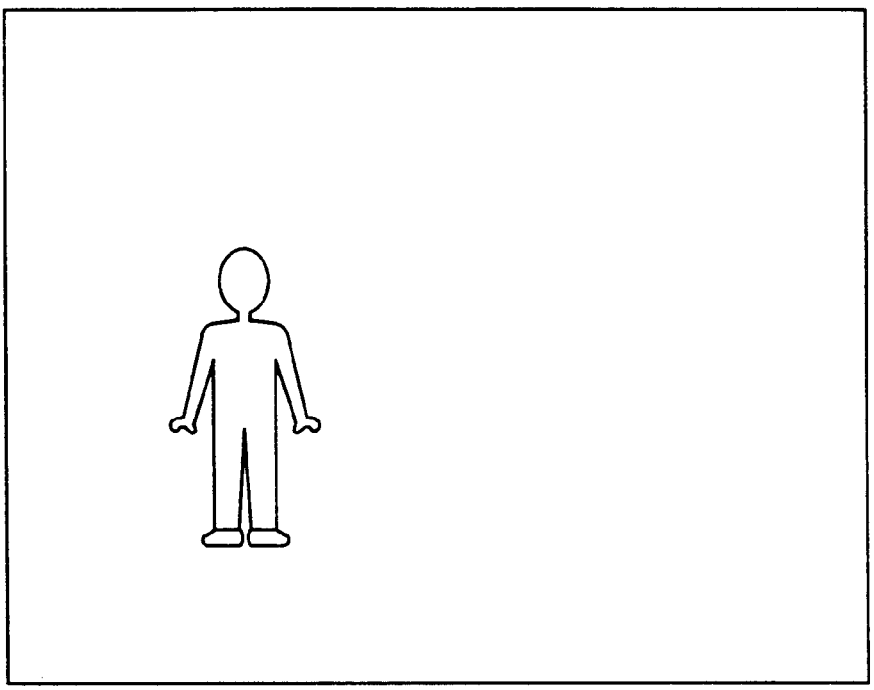
FIG. 5 shows a display example in the first embodiment.

FIG. 4 is a top view of the detection range of the obstacle sensor 2, and shows a case wherein the detection range of the sensor 2 includes obstacle A (another leading vehicle) and obstacle B (pedestrian), which correspond to the sensed image output from the infrared light camera 3 shown in FIG. 3.

In this embodiment, the detection results of obstacles A and B by the obstacle sensor 2 are obtained as a distance Da between the vehicle and obstacle A and an angle $\theta a$ ($\approx 0$) obstacle A makes with the central axis, and a distance Db between the vehicle and obstacle B and an angle $\theta b$ obstacle B makes with the central axis.

Therefore, when the position relationship between the central axis of the detection range of the obstacle sensor 2, and the coordinate axis of the image sensing surface (field angle) of the infrared light camera 3 is determined in advance in correspondence with each other, the distance D to an obstacle output from the obstacle sensor 2 is counted as the number of lines (the number of pixels) from the lower side of the image sensing surface, and the angle $\theta$ is counted as the number of pixels from the central line in the horizontal direction of the image sensing surface, as shown in FIG. 3. As a result, it can be determined that a radiation heat source including a position (pixel) in the image sensing surface, which is specified by these counts, corresponds to the entire shape of an obstacle detected by the obstacle sensor 2. Therefore, if such processing is done in step S6, the display controller 1 can recognize an obstacle included in the sensed image of the infrared light camera 3 and the distance D to that obstacle in association with each other.

Step S7: Only an image of an obstacle located at a position closest to the vehicle (nearby position) detected in step S6 is displayed on the display 8 (like a display example shown in FIG. 5 with respect to the sensed image of the infrared light camera 2 shown in FIG. 3).

As an example of a processing in this step, display colors of surrounding pixels other than an image corresponding to the obstacle located at the position closest to the vehicle of an image signal for one frame that includes the image of the obstacle are converted into black (expressed by white in FIG. 5) before the image is displayed.

At this time, as a method of identifying a pixel group that form the obstacle detected in step S6 from a plurality of pixels (pixel values) that form an image signal for one frame, a radiation heat source (corresponding to a person in front of the vehicle in FIG. 3) corresponding to the obstacle detected by the infrared ray camera 3 normally has a higher temperature than the ambient temperature of the obstacle, and the temperature difference within that radiation heat source is smaller than that around the radiation heat source. Hence, by detecting this temperature difference, the pixel group (radiation heat source) that form the obstacle (an obstacle closest to the vehicle) can be easily identified from the pixel group around that obstacle.

As described above, according to this embodiment, since only the image of the obstacle closest to the vehicle is displayed on the display 8, even when the sensed image output from the infrared light camera 3 actually includes a plurality of obstacles, the driver can easily recognize the presence of the obstacle, which he or she must watch out most upon driving the vehicle.

In this embodiment, the aforementioned display control is done in the auto mode. Alternatively, the processing for emphasizing and displaying the obstacle located at the position closest to the vehicle may be done when an image is displayed on the display 8 in the manual mode.

[Second Embodiment]

The second embodiment, which is based on the aforementioned display apparatus for a vehicle according to the first embodiment, will be explained below. In the following description, an explanation of the same arrangement as that in the first embodiment will be omitted, and a characteristic feature of this embodiment will be mainly explained.

Figure 6:
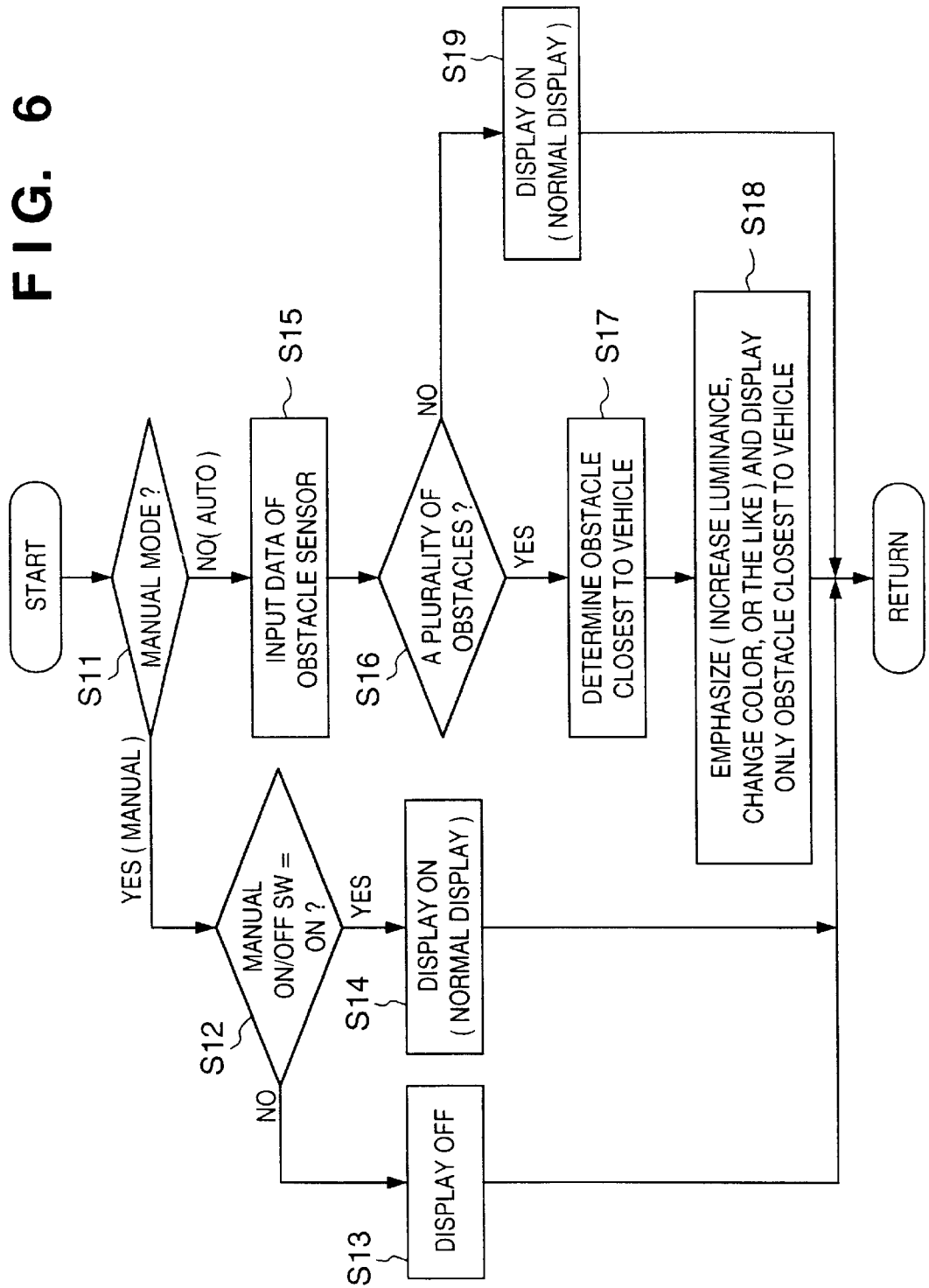
FIG. 6 is a flow chart of a display control processing by a display apparatus for a vehicle according to the second embodiment of the present invention.

FIG. 6 is a flow chart of a display control processing by the display apparatus for a vehicle according to the second embodiment, and shows the sequence of software executed by the CPU 101 while the ignition key switch of the vehicle is ON, and the power switch 11 is ON.

Referring to FIG. 6, the processing in steps S11 to S15 are the same as those in steps S1 to S5 in the first embodiment (FIG. 2).

Step S16: The CPU 101 checks if data corresponding to the output signal from the obstacle sensor 2, which is loaded in step S15, includes data which represent distances D and angles $\theta$ associated with a plurality of obstacles. If YES in step S16 (if a plurality of obstacles are present), the flow advances to step S17; if NO in step S16 (if one obstacle is present), the flow advances to step S19.

Step S17: Since it is determined in step S16 that there are a plurality of obstacles, in this step the CPU 101 selects data corresponding to an output signal, which represents the shortest distance to the vehicle, of those of the plurality of obstacles detected by the obstacle sensor 2, and associates the selected data with an image (pixel group) of the obstacle corresponding to that data, which is included in a sensed image output from the infrared light camera 3, as in the processing in step S6 in the first embodiment (FIG. 2).

Figure 7:
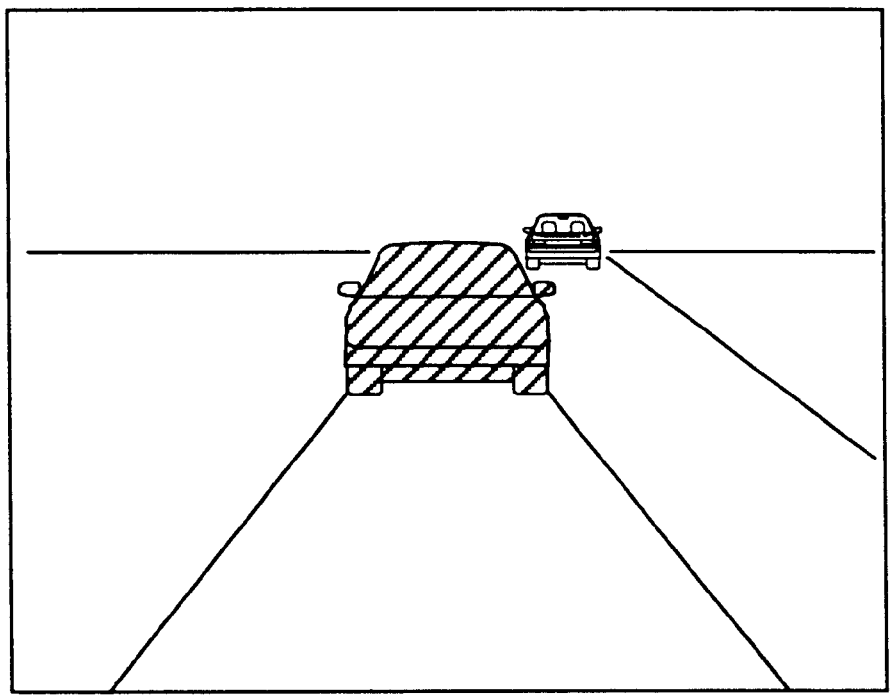
FIG. 7 shows a display example in the second embodiment (when a plurality of obstacles are present)

Step S18: Only the image of the obstacle associated in step S17 is emphasized and displayed on the display 8, as shown in a display example in FIG. 7, and the flow returns.

As examples of such emphasis display mode, a mode for changing the contrast of the image of the obstacle of interest from that of the surrounding image, a mode for increasing the luminance, a mode for changing the display color, a mode for outline-displaying the image of the obstacle of interest, or the like may be used. On the other hand, the method of recognizing a pixel group that form the image of the associated closest obstacle in the sensed image can be the same as that in step S7 in the first embodiment (FIG. 2).

Step S19: Since it is determined in step S16 that one obstacle is present, in this step the CPU 101 displays the sensed image output from the infrared light camera 3 on the display 8 without any modification, as shown in a display example of FIG. 8, and the flow returns.

As described above, according to this embodiment, since the display mode of the image of the obstacle closest to the vehicle to be displayed on the display 8 is emphasized, even when the sensed image output from the infrared light camera 3 actually includes a plurality of obstacles, the driver can easily recognize the presence of the obstacle, which he or she must watch out most upon driving the vehicle.

[Third Embodiment]

The third embodiment, which is based on the aforementioned display apparatus for a vehicle according to the second embodiment, will be explained below. In the following description, an explanation of the same arrangement as that in the second embodiment will be omitted, and a characteristic feature of this embodiment will be mainly explained.

In this embodiment, the processing in step S18 is different from that in the second embodiment (FIG. 6).

Figure 9:
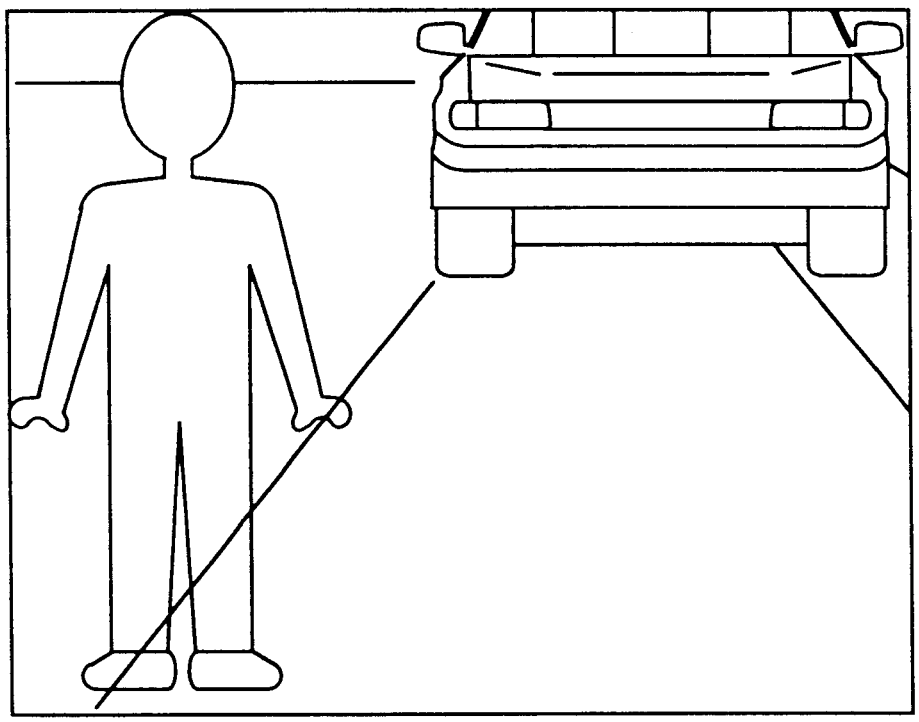
FIG. 9 shows a display example of an obstacle displayed in an enlarged scale in the third embodiment of the present invention.

More specifically, this embodiment computes a zoom ratio at which an image of the associated, closest obstacle can be displayed to the full length or width of the display 8, and extracts a partial image corresponding to that zoom ratio from the sensed image output from the infrared light camera 3. Then, an enlarged-scale image which is obtained by executing a general digital zoom processing of the extracted partial image is displayed on the display 8 (as shown in a display example of FIG. 9 with respect to the sensed image from the infrared light camera 2 shown in, e.g., FIG. 3).

As described above, according to this embodiment, since the image of the obstacle closest to the vehicle is displayed on the display 8 in an enlarged scale, even when the sensed image output from the infrared light camera 3 actually includes a plurality of obstacles, the driver can easily recognize the presence of the obstacle, which he or she must watch out most upon driving the vehicle.

[Fourth Embodiment]

The fourth embodiment, which is based on the aforementioned display apparatus for a vehicle according to the second embodiment, will be explained below. In the following description, an explanation of the same arrangement as that in the second embodiment will be omitted, and a characteristic feature of this embodiment will be mainly explained.

Figure 10:
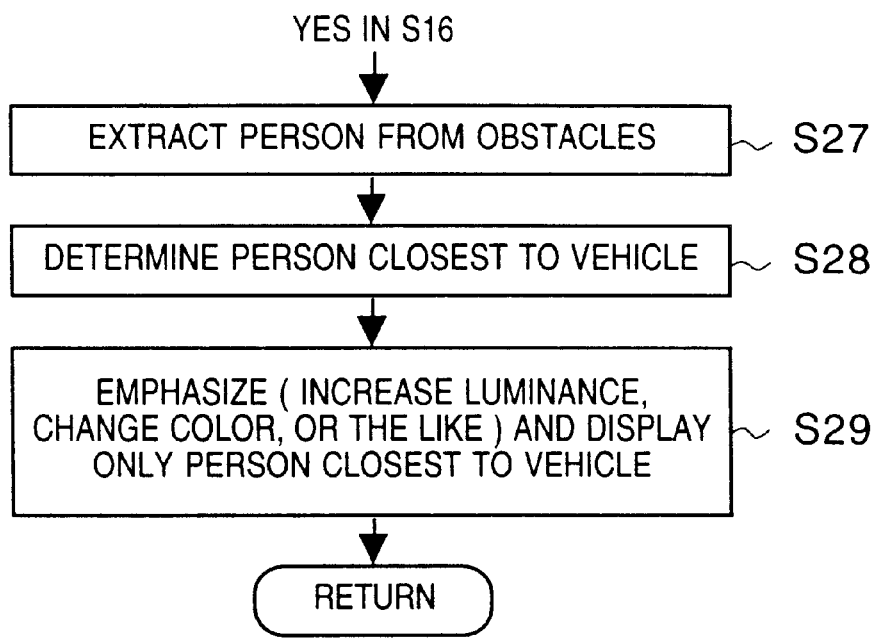
FIG. 10 is a flow chart showing only steps, which are different from the second embodiment, of the display control processing by a display apparatus for a vehicle according to the fourth embodiment of the present invention.

FIG. 10 is a flow chart showing only steps, which are different from the second embodiment, of the display control processing by a display apparatus for a vehicle according to the fourth embodiment of the present invention.

Step S27 in FIG. 10: Since it is determined in step S16 that there are a plurality of obstacles, images of persons are extracted from the images of those obstacles. As an example of a method of extracting an image portion of a person, since it is known that radiation heat of a person sensed by the infrared light camera normally falls within a predetermined temperature range, a heat source, the detected (sensed) radiation temperature of which falls within the predetermined temperature range, can be selected from the sensed image output from the infrared light camera 3.

Figure 11:
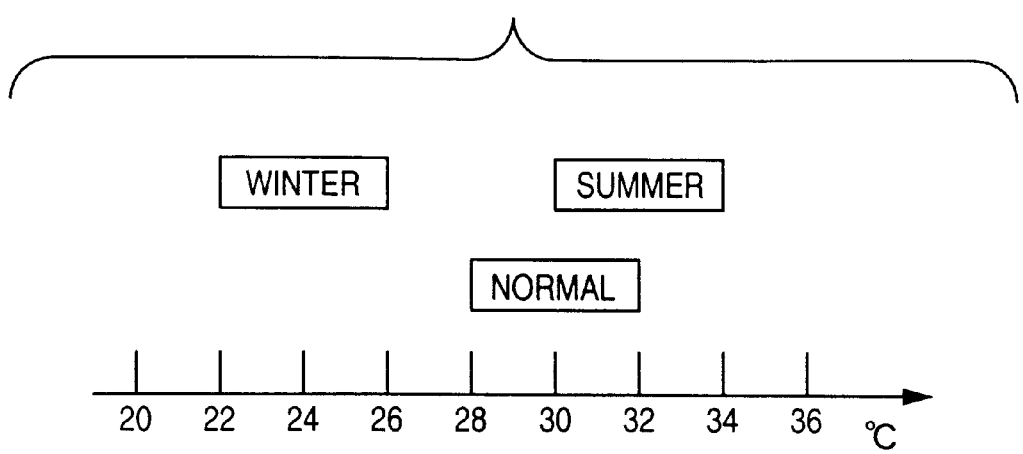
FIG. 11 shows the radiation temperature range of a person to be set in a display controller.

Also, it is known that the temperature range of radiation heat of a normal person increases with increasing atmospheric temperature. Hence, a plurality of temperature ranges are prepared in advance, as shown in FIG. 11, one of these temperature ranges is selected in accordance with the detection result from the atmospheric temperature sensor 5, a timepiece equipped in the display controller 1 or the vehicle, or calendar or time information acquired from a GPS signal using the GPS sensor 4, and the selected temperature range can be used in discrimination in step S27.

Step S28: One of the extracted image portions of the persons, which is closest to the vehicle, is determined in the same manner as in the processing in step S17 in the second embodiment (FIG. 6), i.e., that in step S6 in the first embodiment (FIG. 2).

Figure 12A:
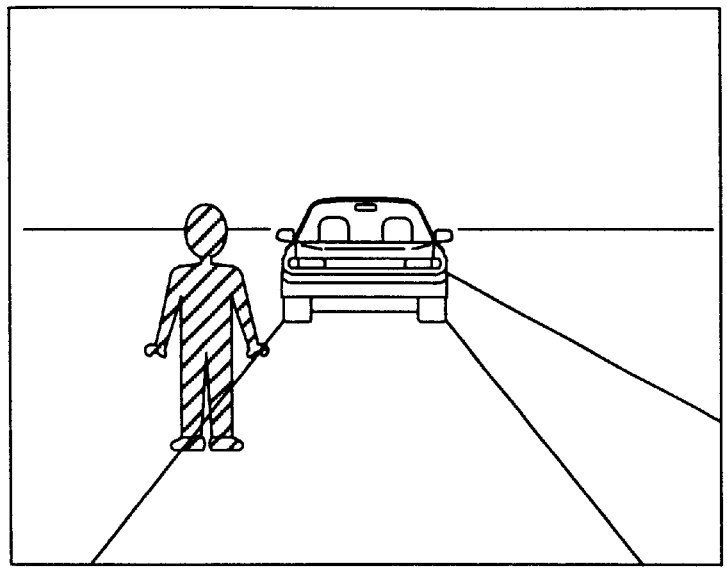
FIGS. 12A and 12B show display examples in the fourth embodiment.

Step S29: Only the image of the person closest to the vehicle, which is extracted in step S28, is emphasized and displayed on the display 8, as shown in a display example in FIG. 12A, and the flow returns. As examples of emphasis display modes, a mode for increasing the luminance, a mode for changing the display color, a mode for outline-displaying the image of the obstacle of interest, or the like may be used as in step S18.

Figure 12B:
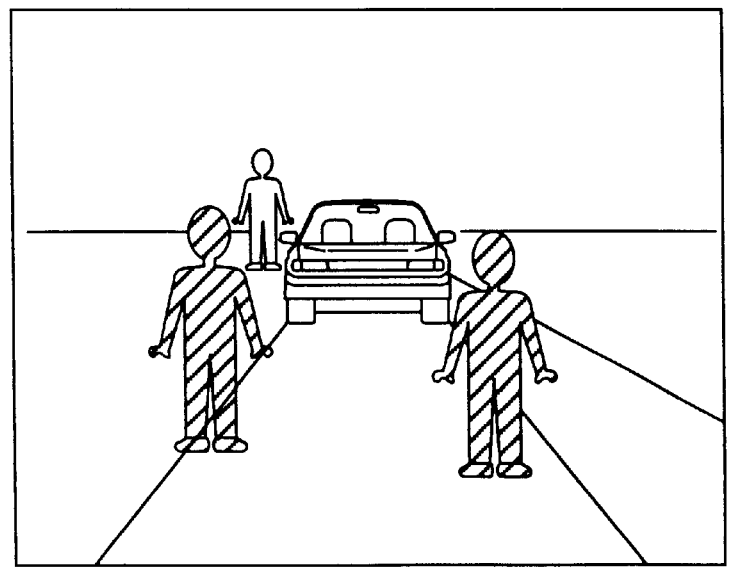

In this embodiment, only the image of a person closest to the vehicle is emphasized and displayed. Alternatively, when a predetermined number of images of persons may be selected in ascending order of distance D to the vehicle on the basis of the detection result of the obstacle sensor 2 in step S28, and the selected images may be emphasized and displayed in step S29, not only the closest person but also a predetermined number of persons close to that person may be emphasized and displayed, as shown in a display example of FIG. 12B.

As described above, according to this embodiment, since the image of the obstacle closest to the vehicle is emphasized and displayed on the display 8, even when the sensed image output from the infrared light camera 3 actually includes a plurality of obstacles, the driver can easily recognize the presence of the person to be protected, which he or she must watch out most upon driving the vehicle.

[Fifth Embodiment]

The fifth embodiment, which is based on the display apparatus for a vehicle according to the second and fourth embodiments mentioned above, will be described below. In the following description, an explanation of the same arrangement as that in the second embodiment will be omitted, and a characteristic feature of this embodiment will be mainly explained.

Figure 13:
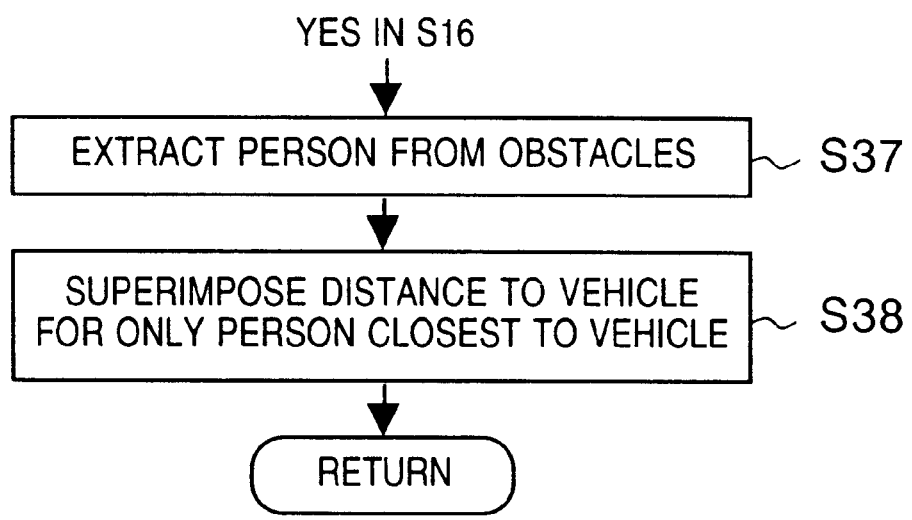
FIG. 13 is a flow chart showing only steps, which are different from the second embodiment, of the display control processing by a display apparatus for a vehicle according to the fifth embodiment of the present invention.

FIG. 13 is a flow chart showing only steps, which are different from the second embodiment, of the display control processing by a display apparatus for a vehicle according to the fifth embodiment of the present invention.

Step S37 in FIG. 13: Since it is determined in step S16 that there are a plurality of obstacles, images of persons are extracted from the images of those obstacles as in step S27 in the fourth embodiment (FIG. 10).

Figure 14:
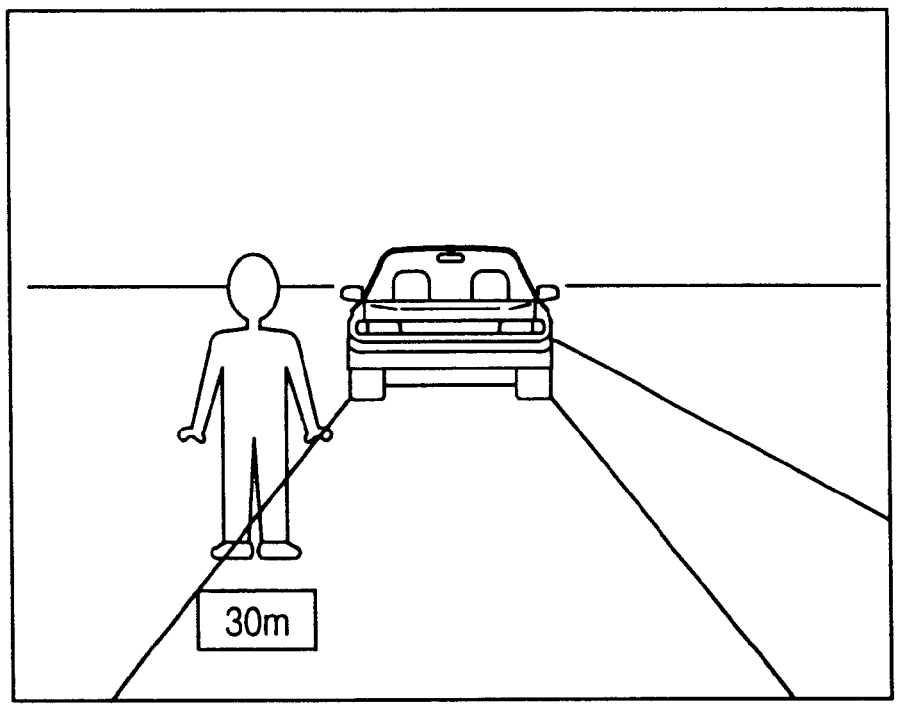
FIG. 14 shows a display example in the fifth embodiment.

Step S38: One of the extracted persons, who is closest to the vehicle, is determined as in step S28 in the fourth embodiment (FIG. 10). The sensed image from the infrared light camera 3 is displayed on the display 8, and the distance value to the vehicle as the detection result of the obstacle sensor 2, which is referred to upon determining the person closest to the vehicle, is superimposed near the image of that person included in the displayed image, as shown in a display example of FIG. 14.

As described above, since the distance to the person closest to the vehicle is superimposed on the display 8 as a numerical value, even when the sensed image output from the infrared light camera 3 actually includes a plurality of obstacles, the driver can easily recognize the presence of the person to be protected, which he or she must watch out most upon driving the vehicle.

<Modification of Fifth Embodiment>

In the fifth embodiment described above, the distance value is superimposed near only the image of the person upon displaying the sensed image from the infrared light camera 3 on the display 8. However, this embodiment is not limited to persons, but may superimpose the distance value near an obstacle closest to the vehicle.

Figure 15A:
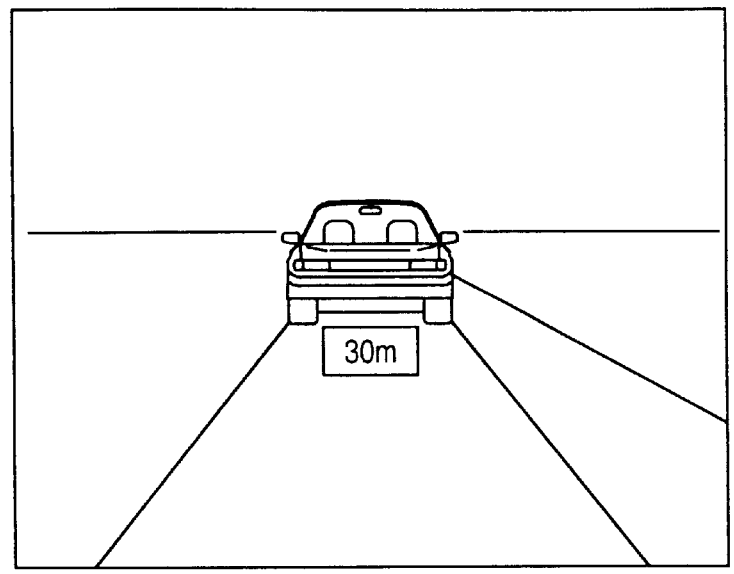
FIGS. 15A and 15B show display examples in a modification of the fifth embodiment.
Figure 15B:
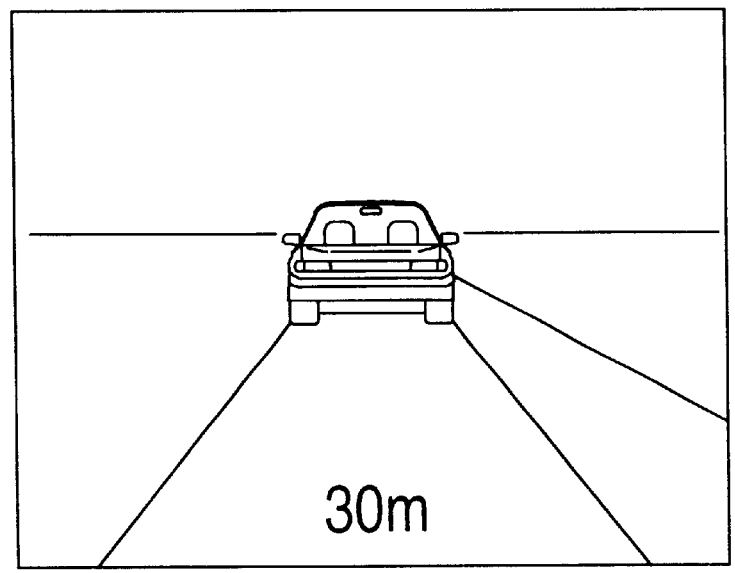

Therefore, unlike in the fifth embodiment, the processing in step S37 of extracting image portions of persons from the sensed image from the infrared light camera 3 need not be executed, Also, in step S38 an obstacle closest to the vehicle is determined, the sensed image from the infrared light camera 3 is displayed on the display 8, and the distance value to the vehicle as the detection result of the obstacle sensor 2, which is referred to upon determining the obstacle closest to the vehicle, is superimposed near the image of that obstacle included in the displayed image, as shown in a display example of FIGS. 15A or 15B.

As described above, according to this modification, since the distance to the obstacle closest to the vehicle is superimposed displayed on the display 8 as a numerical value, even when the sensed image output from the infrared light camera 3 actually includes a plurality of obstacles, the driver can easily recognize the presence of the obstacle, which he or she must watch out most upon driving the vehicle.

[Sixth Embodiment]

Figure 16:
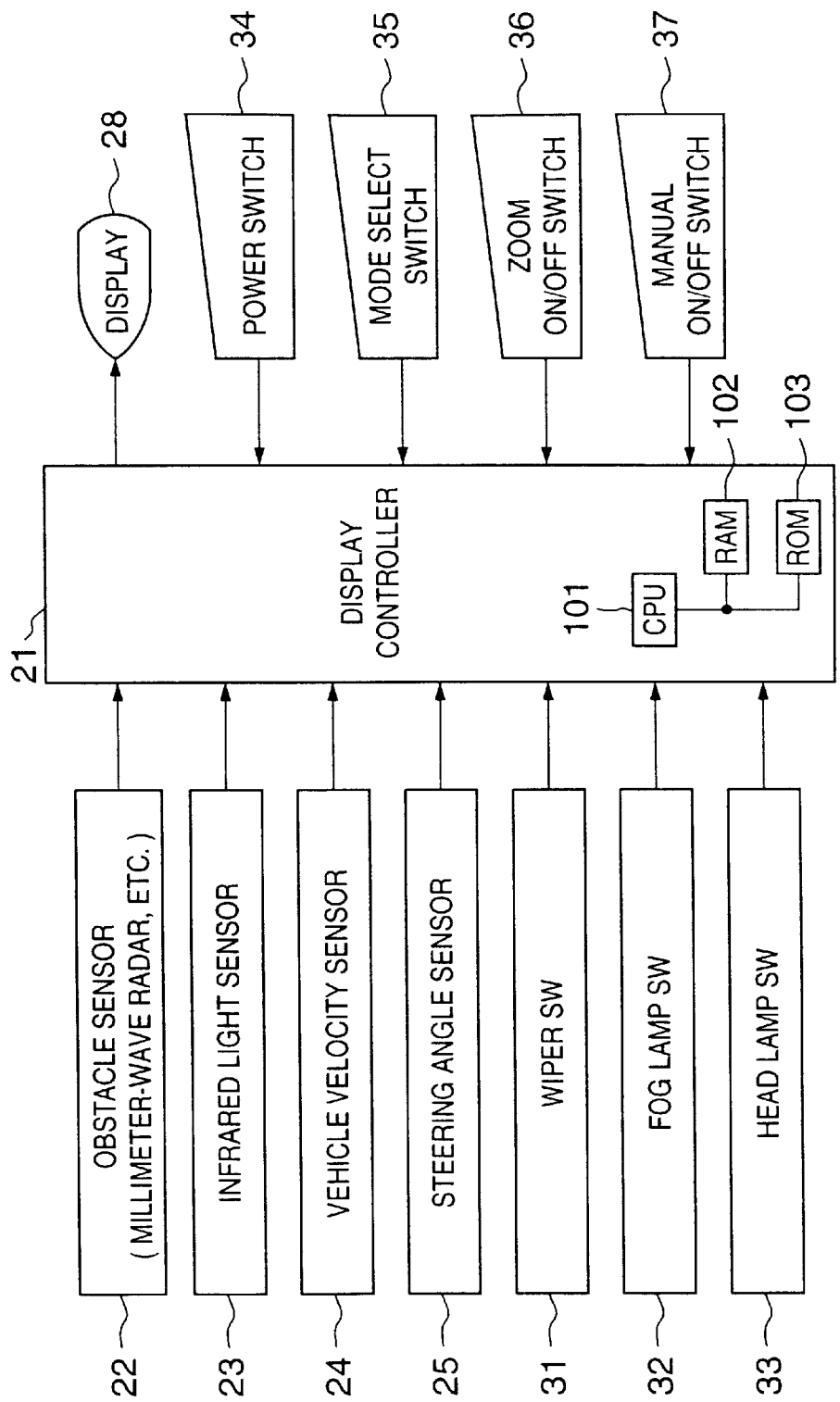
FIG. 16 is a block diagram of a display apparatus for a vehicle according to the sixth embodiment of the present invention.

FIG. 16 is a block diagram of a display apparatus for a vehicle according to the sixth embodiment of the present invention.

Referring to FIG. 16, reference numeral 22 denotes an obstacle sensor such as a CCD (Charge Coupled Device) camera, laser radar, millimeter-wave radar, or the like for detecting the distance to an obstacle ahead of the vehicle by a known method. Reference numeral 23 denotes an infrared light (infrared ray) camera for sensing an image of an environment ahead of the vehicle using infrared rays.

Reference numeral 24 denotes a vehicle velocity sensor for detecting the vehicle velocity as a travel state of the vehicle. Reference numeral 25 denotes a steering angle sensor for detecting the steering angle of the vehicle.

Reference numeral 28 denotes a display such as a liquid crystal display, head-up display, or the like for displaying an image sensed by the infrared light camera 23 (to be referred to as an infrared ray image hereinafter). Note that the display 28 is preferably laid out at a position (e.g., near the central position of a dashboard) in front of the driver's seat of the vehicle where the driver can easily see the displayed image without largely moving the line of sight when he or she looks forward.

Reference numeral 31 denotes a wiper switch with which the driver can start/stop wipers provided to the vehicle, and can set its operation state such as an operation speed (period) or the like. Reference numeral 32 denotes a fog lamp switch with which the driver can turn on/off fog lamps provided to the vehicle. Reference numeral 33 denotes a head lamp switch with which the driver can turn on/off head lamps provided to the vehicle.

Reference numeral 34 denotes a power switch which allows the operator (driver) to turn on/off power supply to a display controller 21. Reference numeral 35 denotes a mode select switch which allows the operator to select a desired display mode of a sensed image on the display 28. The display mode that can be selected by this switch includes a manual mode which displays an infrared light image on the display 28 while the operator holds a manual ON/OFF switch 37 ON, and an auto mode which displays an infrared light image on the display 28 in accordance with a display control processing (to be described later) when the auto mode is selected by the mode select switch 35.

Reference numeral 36 denotes a zoom ON/OFF switch which allows the driver to select whether or not an image of an obstacle included in the infrared ray image is displayed in an enlarged scale (zoom mode) when the auto mode is selected by the mode select switch 35.

The manual ON/OFF switch 37 is used to display the infrared ray sensed image on the display 28 while the operator holds this switch ON when the manual mode is selected by the mode select switch 35.

The display controller 21 controls display of the infrared ray image on the display 28 on the basis of output signals (data corresponding to the output signals) from the respective sensors, and the detected operation states of the operation switches (to be described in detail later).

The display control processing of the display controller 21 is executed by a CPU 101 in accordance with software pre-stored in a ROM 103 or the like while using a RAM 102 as a work area.

An example of the display control processing done by the display controller 21 in this embodiment will be described below.

Figure 17:
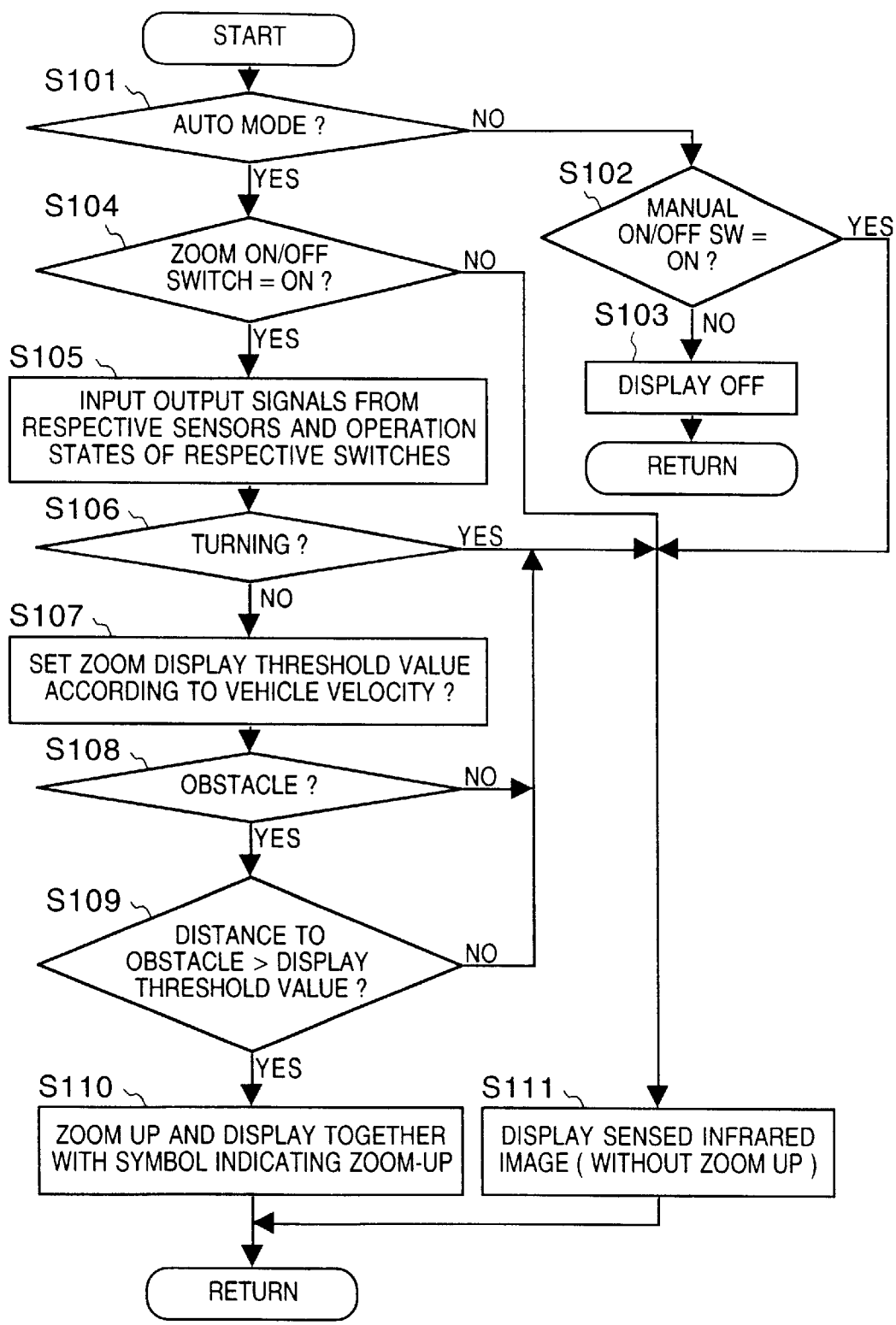
FIG. 17 is a flow chart of a display control processing by the display apparatus for a vehicle according to the sixth embodiment.

FIG. 17 is a flow chart of the display control processing by the display apparatus for a vehicle according to the sixth embodiment. FIG. 17 shows the sequence of software executed by the CPU 101 while the ignition key switch of the vehicle is ON, and the power switch 34 is ON.

Step S101 in FIG. 17: The CPU 101 checks by detecting the operation state of the mode select switch 35 if the auto mode is selected. If NO in step S101 (manual mode), the flow advances to step S102; if YES in step S101 (auto mode), the flow advances to step S104.

Step S102: Since the manual mode is selected, the CPU 101 checks if the manual ON/OFF switch 37 is ON. If YES in step S102 (switch 37: ON), the flow advances to step S111 to start or continue display of the infrared ray image; if NO in step S102 (switch 37: OFF), the flow advances to step S103 to stop display of the infrared ray image.

Step S103: The CPU 103 stops display of the infrared ray image on the display 28, or continues a stop state.

Step S104: Since the auto mode is selected, the CPU 101 checks if the zoom ON/OFF switch 36 is ON. If YES in step S104 (switch 36: ON), the flow advances to step S105; if NO in step S104 (switch 36: OFF), the flow advances to step S111 to start or continue display of the infrared ray image, which is sensed by the infrared light camera 23 and is not modified.

Step S105: The CPU 101 loads data corresponding to the output signals from the respective sensors and signals representing the operation states of the respective switches, which have been explained above with reference to FIG. 16.

Step S106: The CPU 101 checks if the data corresponding to the output signals from the vehicle velocity sensor 24 and steering angle sensor 25 acquired in step S105 respectively represent a vehicle velocity larger than a predetermined velocity and a steering angle larger than a predetermined angle, so as to check if the vehicle is traveling while making a turn. If YES in step S106 (the vehicle is turning), the flow advances to step S111 to start or continue direct display of the infrared ray image sensed by the infrared light camera 23; if NO in step S106 (the vehicle is not turning), the flow advances to step S107.

The reason why enlarged-scale display of an obstacle is inhibited while the vehicle is turning is that turning requires the driver to processing more information and take more actions than in straight travel, and exerts a heavier mental load on driving. Hence, the driver must be prevented from taking fright or being distracted if enlarged-scale display starts in such situation.

Step S107: The CPU 101 sets a display threshold value Th, which serves as a reference in determining if zoom display is made upon displaying an infrared ray image on the display 28, in correspondence with the magnitude of the data corresponding to the output signal from the vehicle velocity sensor 24 acquired in step S105, with reference to a map (table) pre-stored in the ROM 103.

As an example of the characteristics of the display threshold value Th stored in this map, a threshold value which increases with increasing vehicle velocity can be set.

Step S108: The CPU 101 checks the presence/absence of an obstacle ahead of the vehicle on the basis of the data corresponding to the output signal from the obstacle sensor 22 acquired in step ,S105. If YES in step S108 (presence of an obstacle), the flow advances to step S109; if NO in step S108 (absence of an obstacle), the flow advances to step Sill to start or continue direct display of the infrared ray image sensed by the infrared light camera 23.

Step S109: The CPU 101 acquires the location of the obstacle and distance D between that obstacle and the vehicle on the basis of the data corresponding to the output signal from the obstacle sensor 22 acquired in step S105, and checks if the distance D is larger than the display threshold value Th set in step S107. If YES in step S109 (D>Th), the flow advances to step S110 to make enlarged-scale display since the obstacle is faraway from the vehicle and it is hard for the driver to visually recognize the display contents; if NO in step S109 (D≦TH), the flow advances to step Sill to start or continue direct display of the infrared ray image sensed by the infrared light camera 23.

Figure 18:
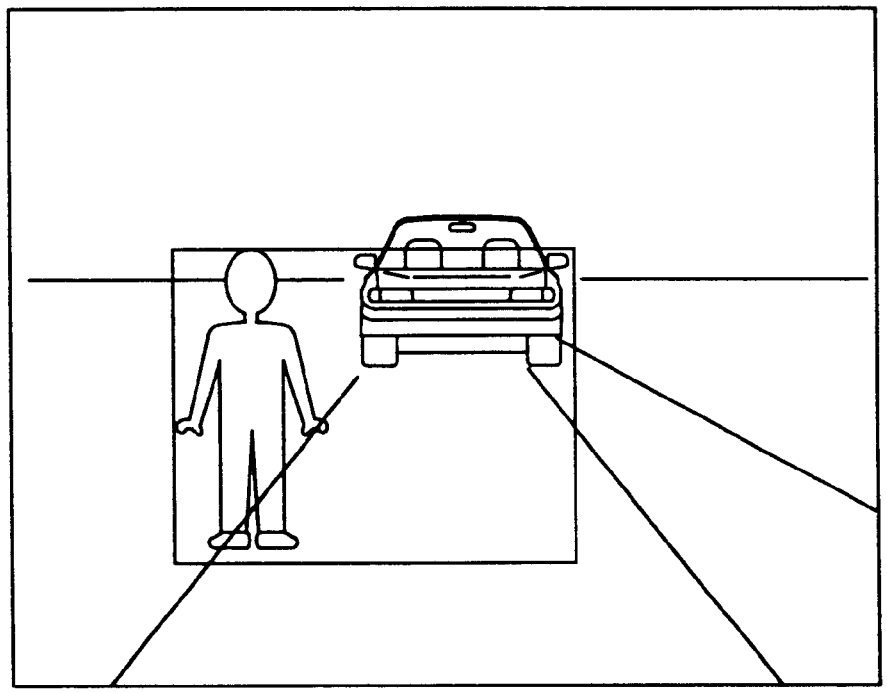
FIG. 18 shows an example of an infrared ray image sensed by an infrared ray camera 23.

Step S111: The CPU 101 starts or continues direct display of an infrared ray image (e.g., an image from which an inner frame is removed from that shown in FIG. 18) sensed by the infrared light camera 23.

Step S110: The CPU 101 associates the obstacle detected by the obstacle sensor 22 with the image of the obstacle contained in the infrared ray image sensed by the infrared light camera 23, computes a zoom ratio at which the image of that obstacle can be displayed to the full length or width of the display, and extracts a partial image corresponding to that zoom ratio from the sensed image of the infrared light camera 23.

Then, the CPU 101 executes a general digital zoom processing of the extracted partial image to obtain an enlarged-scale image (as shown in, e.g., a display example in FIG. 19 with respect to the sensed image of the infrared light camera 23 shown in FIG. 18), and displays that image on the display 28.

Figure 19:
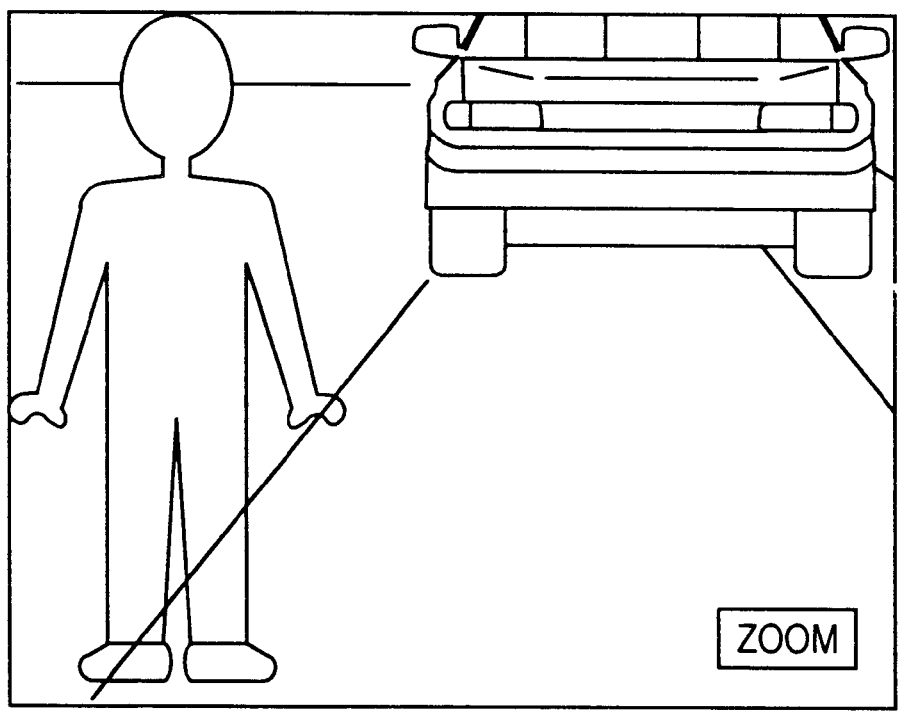
FIG. 19 shows an example of a partial image including obstacles, which is displayed in an enlarged scale, of the infrared ray image.

Upon displaying the enlarged-scale image on the display 28 in this step, a symbol indicating an enlarged-scale image is preferably superimposed, as shown in FIG. 19, so as to inform the driver of that state.

An example of the method of associating the obstacle detected by the obstacle sensor 22 and the image of the obstacle contained in the infrared ray image sensed by the infrared light camera 23 is the same as that in the first embodiment mentioned above with reference to FIGS. 3 and 4.

That is, in this embodiment, when the positional relationship between the central axis of the detection range of the obstacle sensor 22 and the coordinate axis of the image sensing surface (field angle) of the infrared light camera 23 is determined in advance in correspondence with each other, the distance D to the obstacle output from the obstacle sensor 22 can be counted as the number of lines (the number of pixels) from the lower side of the image sensing surface, and the angle θ is counted as the number of pixels from the central line in the horizontal direction of the image sensing surface, as shown in FIG. 3. As a result, it can be determined that a radiation heat source including a position (pixel) in the image sensing surface, which is specified by these counts, corresponds to the entire shape of an obstacle detected by the obstacle sensor 22.

Therefore, when such processing is done in step S110, the display controller 21 can recognize the partial image of the obstacle contained in the sensed image from the infrared light camera 23, and the distance D to that obstacle in association with each other.

Figure 20:
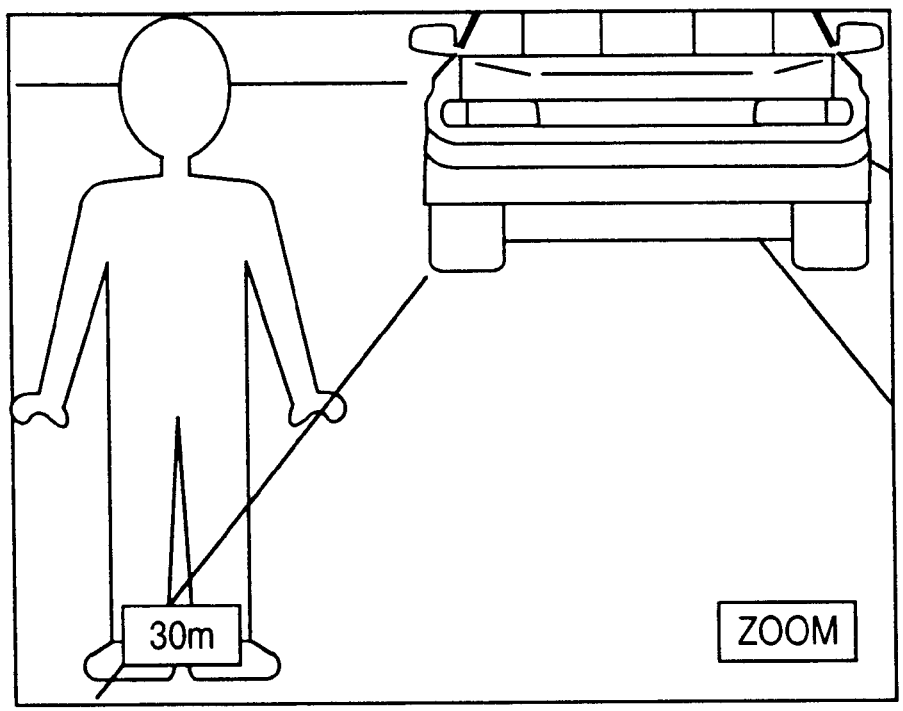
FIG. 20 shows an example of a partial image including obstacles, which is displayed in an enlarged scale, of the infrared ray image.

If it is determined based on the data corresponding to the output signal from the obstacle sensor 22 acquired in step S105 in the processing in step S110 that there are a plurality of obstacles, the smallest one of a plurality of distances D of these obstacles is preferably superimposed on the enlarged-scale display of that obstacle, as shown in FIG. 20, so as to make the driver recognize the distance between that obstacle and the vehicle.

In the processing in step S110, the distance D included in the data corresponding to the output signal from the obstacle sensor 22 is compared with the display threshold value Th. In a specific maneuvering environment such as fog, rain, or the like, the distance D is corrected to be a larger value with increasing operation speed represented by the operation state of the wiper switch 31 (i.e., with decreasing operation period) or to be a larger value than that in the OFF state of the fog lamp switch 32 when the operation state of the fog lamp switch 32 indicates the ON state, prior to comparison with the display threshold value Th.

Conversely, the display threshold value Th set in step S107 may be corrected to decrease with increasing operation speed represented by the operation state of the wiper switch 31 (i.e., with decreasing operation period) or to be a value below that in the OFF state of the fog lamp switch 32 when the operation state of the fog lamp switch 32 indicates the ON state, prior to comparison with the display threshold value Th, so that the image of the detected obstacle is displayed in an enlarged scale at a relatively earlier timing.

Likewise, in the processing in step S109, the display threshold value Th set in accordance with the detected vehicle velocity in step S107 is compared with the detected distance D. By contrast, the display threshold value Th may be set as a constant, and the distance D may be corrected in accordance with the vehicle velocity.

Figure 21:
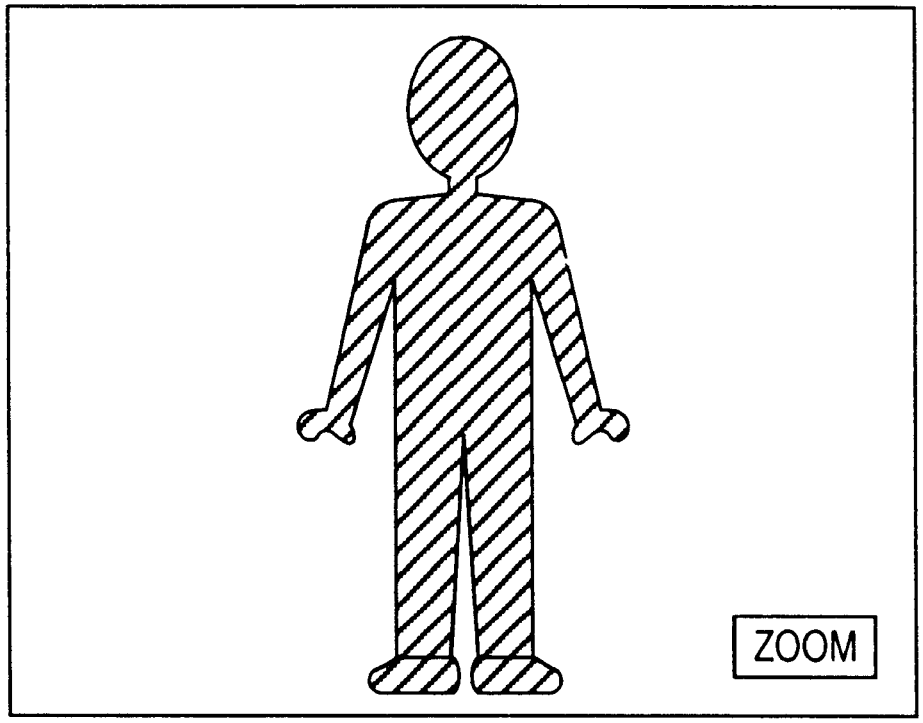
FIG. 21 shows an example of a partial image including an obstacle, which is emphasized and displayed in an enlarged scale, of the infrared ray image.

In place of the enlarged-scale display shown in FIG. 19, only a deformed image of an obstacle closest to the vehicle may be displayed, as shown in FIG. 21, so that the driver can recognize the shape (outline) of that obstacle, or a reduced-scale image of original infrared ray image A that contains obstacle B and an enlarged-scale image of obstacle B may be simultaneously displayed, as shown in FIG. 22. Since image processing that implement these display modes are the state-of-the-art techniques, a detailed description thereof will be omitted in this embodiment.

According to this embodiment, when the auto mode is selected, and the zoom ON/OFF switch 36 is ON, if the distance D between the vehicle and a given obstacle is larger than the display threshold value Th, since the image of the obstacle contained in the infrared ray image is displayed in an enlarged scale, the driver can easily recognize the obstacle far away from the vehicle.

The display threshold value Th used upon determining if enlarged-scale display is made is set to increase with increasing detected vehicle velocity of the vehicle. In this manner, the driver can recognize the obstacle present ahead of the vehicle early in high-speed cruise, and can assure a sufficient time to dodge that obstacle.

Also, since the display threshold value Th is corrected depending on a maneuvering environment estimated in accordance with the operation state of the wipers or the ON/OFF state of the fog lamps prior to determination of enlarged-scale display, enlarged-scale display starts at an earlier timing in rough weather that exerts a heavier mental load on driving than on fine weather, and can adequately assist driver's vision.

In this embodiment, the aforementioned display control is done in the auto mode. Alternatively, the processing for displaying the image of an obstacle in an enlarged scale may be made when the image is displayed on the display 28 in the manual mode.

[Seventh Embodiment]

The seventh embodiment, which is based on the aforementioned display apparatus for a vehicle according to the sixth embodiment, will be described below. In the following description, an explanation of the same arrangement as that in the sixth embodiment will be omitted, and a characteristic feature of this embodiment will be mainly explained.

Figure 23:
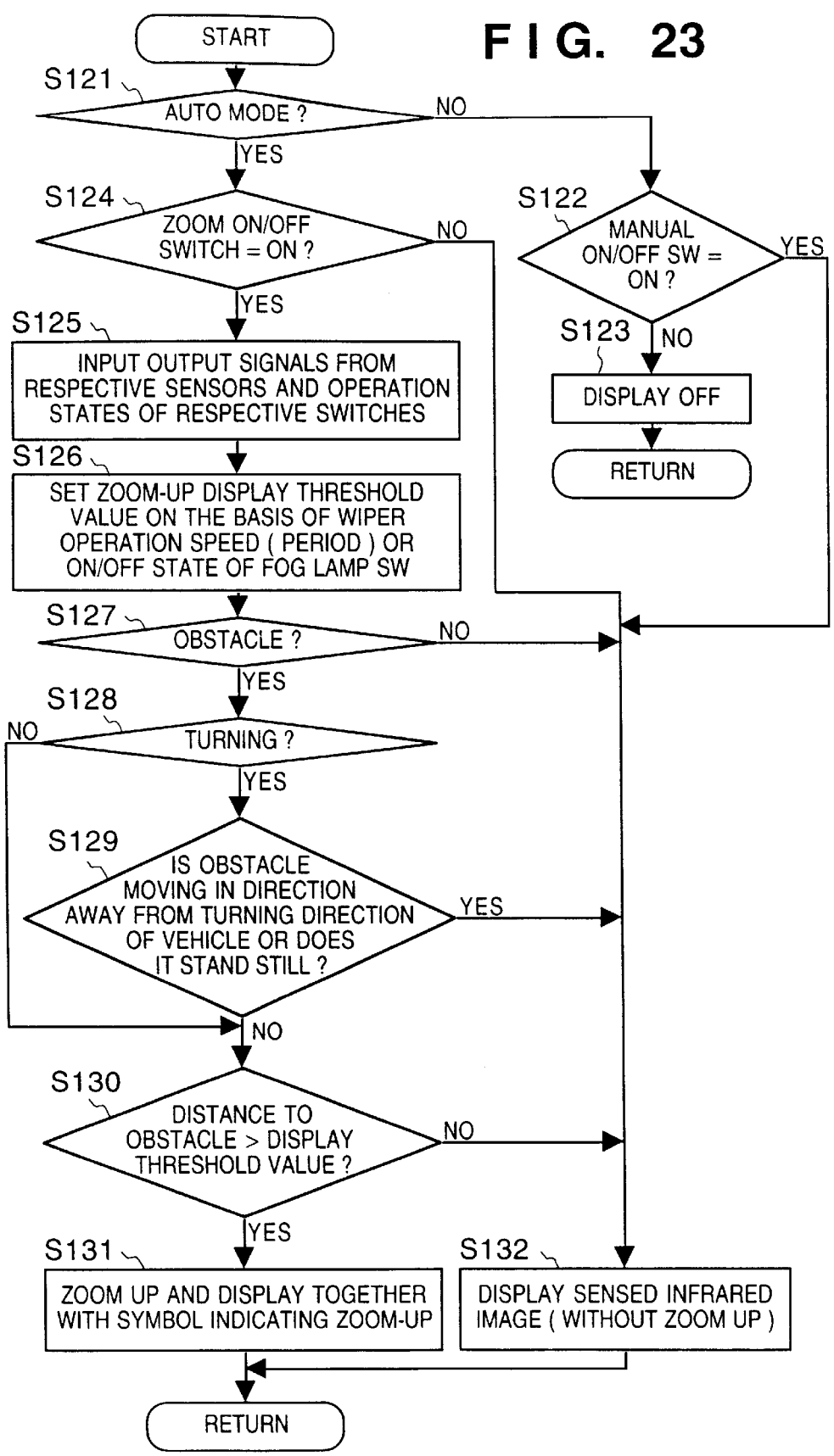
FIG. 23 is a flow chart of a display control processing by a display apparatus for a vehicle according to the seventh embodiment of the present invention.

FIG. 23 is a flow chart of a display control processing by the display apparatus for a vehicle according to the seventh embodiment, and shows the sequence of software executed by the CPU 101 while the ignition key switch of the vehicle is ON, and the power switch 34 is ON.

Steps S121 to S125 in FIG. 23: The same processing as in steps S101 to S105 in the sixth embodiment (FIG. 17) are executed, and if it is determined in step S124 that the zoom ON/OFF switch is OFF, the flow advances to step S132.

Step S126: The CPU 101 sets a display threshold value Th, which serves as a reference in determining if zoom display is made upon displaying an infrared ray image on the display 28, in correspondence with the operation state (operation speed/period) of the wipers and the ON/OFF state of the fog lamps, with reference to a map (table) pre-stored in the ROM 103.

For example, the display threshold value Th is set to decrease with increasing operation speed (i.e., decreasing operation period) represented by the operation state of the wiper switch 31 acquired in step S125. Or the display threshold value Th is set to be a value below that of the OFF state of the fog lamp switch 32 when the operation state of the fog lamp switch 32 indicates the ON state.

Steps S127 and S128: The CPU 101 checks if an obstacle is present, and checks if the vehicle is turning if an obstacle is present, as in the processing in steps S108 and S106 in the sixth embodiment (FIG. 17). If the vehicle is not turning, the flow advances to step S130.

Step S129: Since the vehicle is turning, it is not preferable that the detected obstacle approaches the traveling route along which the vehicle is expected to travel.

Hence, in this step the CPU 101 checks if the detected obstacle is moving in a direction away from the turning direction of the vehicle or stands still. If NO in step S129 (the obstacle relatively approaches the vehicle), the flow advances to step S130 since the image of that obstacle should be displayed in an enlarged scale; if YES in step S129 (the obstacle is moving in a direction opposite to the traveling direction or stands still), the flow advances to step S132 to start or continue direct display of the infrared ray image sensed by the infrared light camera 23.

As an example of the processing in this step, the CPU 101 estimates the traveling direction of the vehicle (predicted route along which the vehicle is expected to travel) on the basis of data representing the output signals from the vehicle velocity sensor 24 and steering angle sensor 25 acquired in step S125, and compares position data obtained by coordinate conversion of the position data of the obstacle detected by the obstacle sensor 22 in the previous control period onto the coordinate system of the estimated traveling route, and the position data of that obstacle acquired in step S125 in the current control period.

As a result of comparison, if the two position data on that coordinate system indicate an identical location, it can be determined that the obstacle stands still; if they indicate different locations, it can be determined that the obstacle is moving. Furthermore, if the obstacle is moving, the CPU 101 checks if the direction of a velocity vector represented by these two position data is approaching the traveling route computed in this step, thus determining if the obstacle and vehicle are moving in directions in which they relatively approach each other.

Note that the estimation method of the traveling route is known to those who are skilled in the art by, e.g., Japanese Laid-Open Patent No. 10-100820 previously proposed by the present applicant, and a detailed description thereof will be omitted in this embodiment.

Steps S130 to S132: The display threshold value Th set in step S126 is compared with the distance D to the obstacle detected by the obstacle sensor 22 in step S130, and enlarged-scale display is made in step S131 or the infrared ray image sensed by the infrared light camera 23 is directly displayed in step S132 in accordance with the comparison result, as in the processing in steps S109 to S111 (FIG. 17) and the display modes shown in FIGS. 19 to 22 in the sixth embodiment.

According to this embodiment mentioned above, when the auto mode is selected and the zoom ON/OFF switch 36 is ON, since the driver can easily recognize an obstacle far away from the vehicle, and enlarged-scale display can be started at an earlier timing in rough weather that exerts a heavier mental load on the driver on driving than in fine weather in accordance with the maneuvering environment estimated based on the operation state of the wipers and ON/OFF state of the fog lamps, driver's vision can be adequately assisted.

When the vehicle is turning, since enlarged-scale display is made only when the detected obstacle and the vehicle are relatively approaching each other, the image of that obstacle can be inhibited from being displayed in an enlarged scale when the obstacle is relatively moving in a direction away from the vehicle, the driver can be prevented from being distracted.

[Eighth Embodiment]

The eighth embodiment, which is based on the aforementioned display apparatus for a vehicle according to the sixth embodiment, will be described below. In the following description, an explanation of the same arrangement as that in the sixth embodiment will be omitted, and a characteristic feature of this embodiment will be mainly explained.

Figure 24:
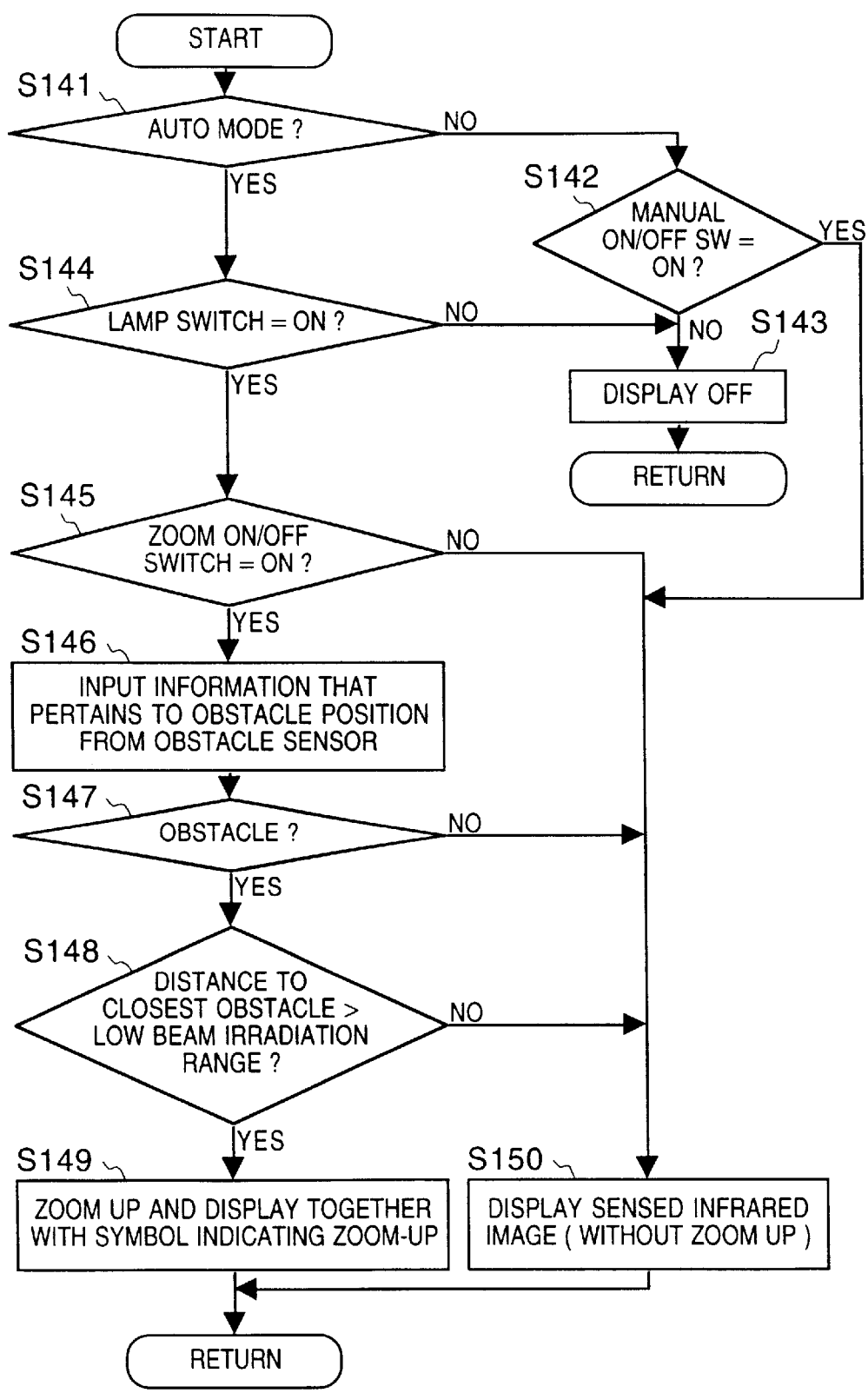
FIG. 24 is a flow chart of a display control processing by a display apparatus for a vehicle according to the eighth embodiment of the present invention.

FIG. 24 is a flow chart of a display control processing by the display apparatus for a vehicle according to the eighth embodiment, and shows the sequence of software executed by the CPU 101 while the ignition key switch of the vehicle is ON, and the power switch 34 is ON.

Steps S141 to S143 in FIG. 24: The CPU 101 executes the same processing as in steps S101 to S103 in the sixth embodiment (FIG. 17), and if it is determined in step S141 that the auto mode is selected, the flow advances to step S144.

Step S144: The CPU 101 checks if the head lamp switch 33 is ON. If YES in step S144 (switch 33: ON), the flow advances to step S145; if NO in step S144 (switch 33: OFF), the flow advances to step S143 to stop display of the infrared ray image.

Step S145: Since the auto mode is selected and the head lamps are ON, the CPU 101 checks if the zoom ON/OFF switch 36 is ON. If YES in step S145 (switch 36: ON), the flow advances to step S146; if NO in step S145, the flow advances to step S150 to start or continue direct display of the infrared ray image sensed by the infrared light camera 23.

Steps S146 and S147: The CPU 101 loads data corresponding to the output signal from the obstacle sensor 22 (step S146), and checks based on the loaded data if an obstacle is present (step S147). If YES in step S147 (an obstacle is present), the flow advances to step S148; if NO in step S147, the flow advances to step S150 to start or continue direct display of the infrared ray image sensed by the infrared light camera 23.

Step S148: If it is determined based on the locations of obstacles and the distances D between those obstacles and vehicle contained in the data acquired in step S146 that only one obstacle is present, the CPU 101 checks if the distance D to that obstacle is larger than a predetermined low beam irradiation distance (range) pre-stored in the ROM 103. On the other hand, if a plurality of obstacles are present, the CPU 101 checks if the distance D to one of obstacles, which is located at a position closest to the vehicle, is larger than the predetermined low beam irradiation distance.

If it is determined in this step that the distance D to the obstacle is larger than the predetermined low beam irradiation distance (YES in step S148), since it is determined that the driver can hardly visually recognize that obstacle, the flow advances to step S149 to display the image of that obstacle in an enlarged scale; if the distance D to the obstacle is equal to or smaller than the predetermined low beam irradiation distance (NO in step S148), since that obstacle is present within the low beam irradiation range and it is determined that the driver can visually confirm the obstacle irradiated with a low beam emitted by the head lamps, the flow advances to step S150 to start or continue direct display of the infrared ray image sensed by the infrared light camera 23.

Steps S149 and S150: The CPU 101 makes enlarged-scale display in step S149 or directly displays the infrared ray image sensed by the infrared light camera 23 in step S150, as in the processing in steps S110 and S111 (FIG. 17) and the display modes shown in FIGS. 19 to 22 in the sixth embodiment.

According to this embodiment described above, when the auto mode is selected and the zoom ON/OFF switch 36 and head lamp switch 33 are ON, if the obstacle detected based on the output signal from the obstacle sensor 22 is present beyond the range (distance) irradiated with a low beam emitted by the head lamps, the image of that obstacle is displayed in an enlarged scale, and the driver can easily recognize the obstacle.

[Ninth Embodiment]

Figure 25:
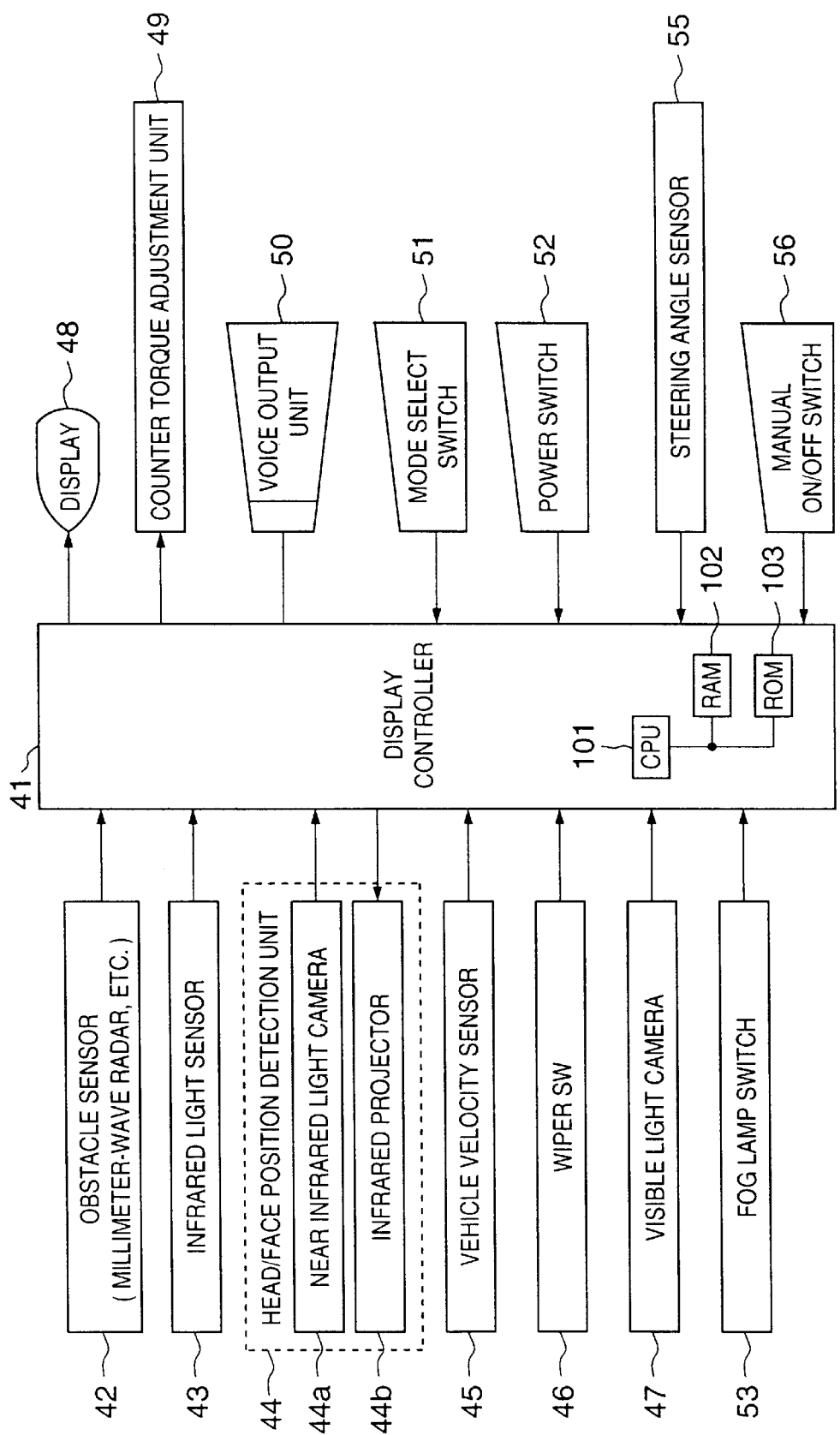
FIG. 25 is a block diagram of a display apparatus for a vehicle according to the ninth embodiment of the present invention.

FIG. 25 is a block diagram of a display apparatus for a vehicle according to the ninth embodiment of the present invention.

Referring to FIG. 25, reference numeral 42 denotes an obstacle sensor such as a CCD (Charge Coupled Device) camera, laser radar, millimeter-wave radar, or the like for detecting the distance to an obstacle ahead of the vehicle by a known method. Reference numeral 43 denotes an infrared light (infrared ray) camera for sensing an image of an environment ahead of the vehicle using infrared rays.

Reference numeral 44 denotes a head/face position detection unit which is provided to, e.g., an instrumental panel in the passenger room and is used to detect the head/face position of the driver. The unit 44 comprises an infrared projector 44b for projecting infrared rays toward the head/face position of the driver seated on the driver's seat, and a near infrared light camera 44a for sensing an image of the head/face of the driver irradiated with light projected by the infrared projector 44b.

Reference numeral 45 denotes a vehicle velocity sensor for detecting the vehicle velocity as a travel state of the vehicle. Reference numeral 46 denotes a wiper switch with which the driver can start/stop wipers provided to the vehicle, and can set its operation state such as an operation speed (period) or the like.

Reference numeral 47 denotes a visible light camera such as a CCD camera or the like for sensing an image ahead of the vehicle.

Reference numeral 48 denotes a display such as a liquid crystal display, head-up display, or the like for displaying an image sensed by the infrared light camera 43 (to be referred to as an infrared ray image hereinafter). Note that the display 48 is preferably laid out at a position (e.g., near the central position of a dashboard) in front of the driver's seat of the vehicle where the driver can easily see the displayed image without largely moving the line of sight when he or she looks forward.

Reference numeral 49 denotes a known steering counter torque adjustment unit for adjusting the steering force required for the driver to steer the vehicle by operating a handle (steering wheel).

Reference numeral 50 denotes a voice output unit for giving various pieces of information to the driver by means of a voice guidance. Reference numeral 51 denotes a mode select switch which allows the operator to select a given display mode of a sensed image on the display 48. The display mode that can be selected by this switch includes a manual mode which displays an infrared light image on the display 48 while the operator holds a manual ON/OFF switch 56 ON, and an auto mode which displays an infrared light image on the display 48 in accordance with a display control processing (to be described later), when the auto mode is selected by the mode select switch 51.

Reference numeral 52 denotes a power switch which allows the operator (driver) to turn on/off power supply to a display controller 41.

The manual ON/OFF switch 56 is used to display the infrared ray sensed image on the display 48 while the operator holds this switch ON when the manual mode is selected by the mode select switch 51.

The display controller 41 controls display of the infrared ray image on the display 48 on the basis of output signals (data corresponding to the output signals) from the respective sensors, and the detected operation states of the operation switches (to be described in detail later).

The display control processing of the display controller 41 is executed by a CPU 101 in accordance with software pre-stored in a ROM 103 or the like while using a RAM 102 as a work area.

An example of the display control processing done by the display controller 41 in this embodiment will be described below.

Figure 26:
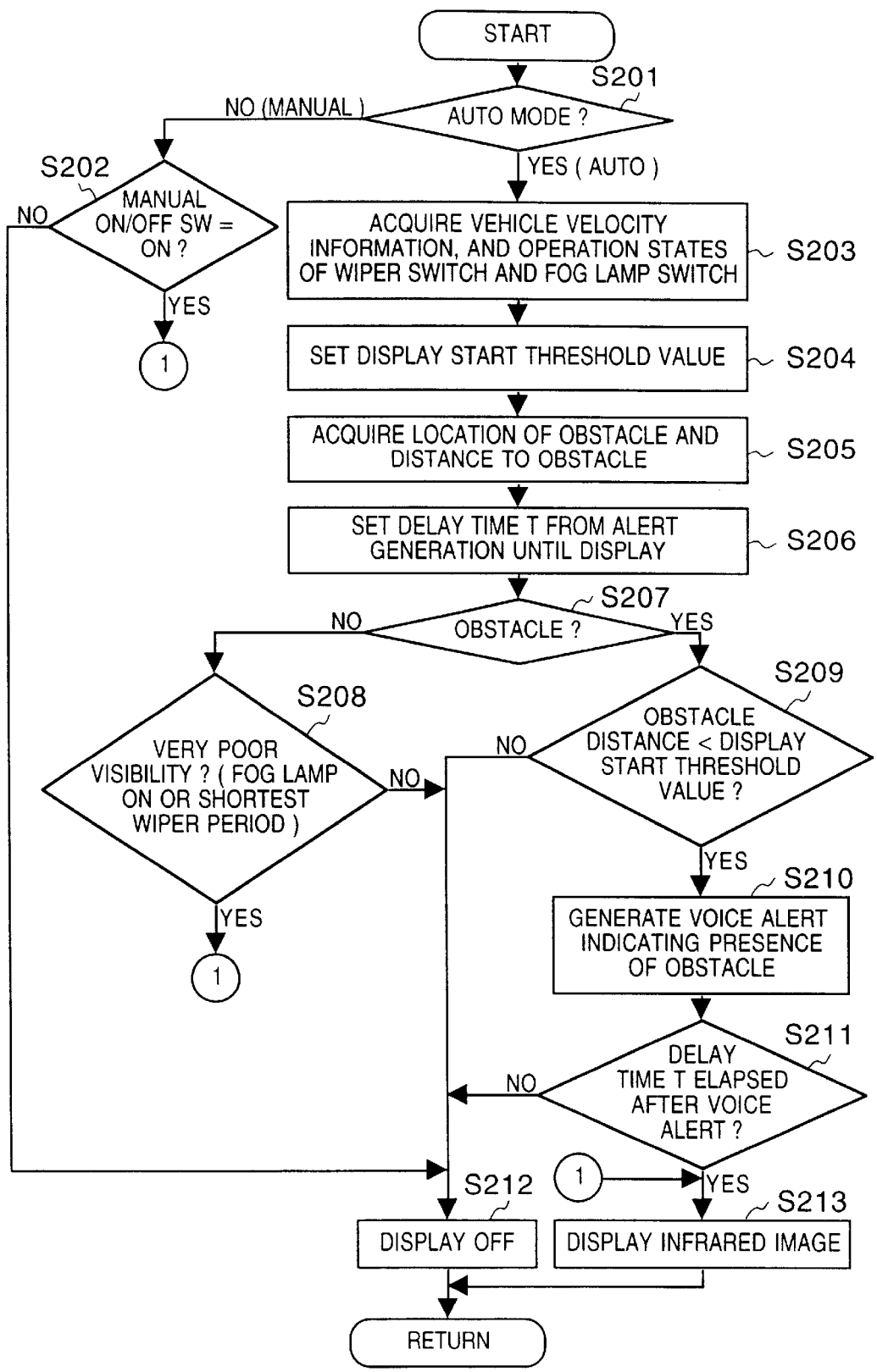
FIG. 26 is a flow chart of a display control processing by the display apparatus for a vehicle according to the ninth embodiment.

FIG. 26 is a flow chart of the display control processing by the display apparatus for a vehicle according to the ninth embodiment, and shows the sequence of software executed by the CPU 101 while the ignition key switch of the vehicle is ON, and the power switch 52 is ON.

Step S201 in FIG. 26: The CPU 101 checks by detecting the operation state of the mode select switch 51 if the auto mode is selected. If NO in step S201 (manual mode), the flow advances to step S202; if YES in step S201 (auto mode), the flow advances to step S203.

Step S202: Since the manual mode is selected, the CPU 101 checks if the manual ON/OFF switch 56 is ON. If YES in step S202 (switch 56: ON), the flow advances to step S213 to start or continue display of the infrared ray image; if NO in step S202 (switch 56: OFF), the flow advances to step S212 to stop display of the infrared ray image.

Step S203: Since the auto mode is selected, the CPU 101 loads data corresponding to the output signal from the vehicle velocity sensor 45 and signals representing the operation states of the wiper switch 46 and a fog lamp switch 53.

Step S204: The CPU 101 sets a display start threshold value Th, which serves as a reference in determining if zoom display is made upon displaying an infrared ray image on the display 48, with reference to a map (table) pre-stored in the ROM 103.

As an example of the characteristics of the display threshold value Th stored in this map, a threshold value which increases with increasing vehicle velocity acquired in step S203 can be set. Alternatively, a threshold value which increases with increasing operation speed (i.e., decreasing operation period) represented by the operation state of the wiper switch 46 acquired in step S203 can be set. Also, a larger threshold value can be set compared to the OFF state of the fog lamp switch 53 when the operation state of the flog lamp switch 53 acquired in step S203 represents the ON state.

Step S205: The CPU 101 obtains the locations of obstacles ahead of the vehicle and distances D between those obstacles and the vehicle by acquiring data corresponding to the output signal from the obstacle sensor 42.

Step S206: The CPU 101 sets a delay time T from a generation timing of an alert (guidance) by the voice output unit 50, which indicates the start of display of the infrared ray image until display of the infrared ray image actually starts, with reference to a map (table) pre-stored in the ROM 103. As an example of the characteristics of the delay time T stored in that map, a time which decreases with decreasing distance D acquired in step S205 can be set. Or a time which decreases with increasing vehicle velocity acquired in step S203 can be set.

Step S207: The CPU 101 checks if the data corresponding to the output signal from the obstacle sensor 42 acquired in step S205 includes information (location and distance D) that represents the presence of an obstacle. If NO in step S207 (absence of an obstacle), the flow advances to step S208; if YES in step S207, the flow advances to step S209.

Step S208: Even when no obstacle is present ahead of the vehicle, if visibility in the forward direction is not good depending on the weather condition such as heavy fog or the like, the infrared ray image should be displayed to help driving of the driver. In this step, the CPU 101 checks if the operation state of the fog lamp switch 53 acquired in step S203 is ON or the operation state of the wiper switch 46 acquired in step S203 indicates a low-speed (or intermittent) operation. If YES in step S208 (the fog lamps are ON or the wipers are in low-speed operation), since it can be estimated that visibility in the forward direction is not good, the flow advances to step S213 to start or continue display of the infrared ray image; if NO in step S208 (the fog lamps are OFF or the wipers are not operated), the flow advances to step S212 to stop display of the infrared ray image.

Step S209: Since an obstacle is present ahead of the vehicle, the CPU 101 checks if the distance D to the obstacle acquired in step S205 is smaller than the display start threshold value Th set in step S204, so as to determine if the infrared ray image is to be displayed. If NO in step S209 (D≧Th), since it can be determined that display of the infrared ray image is not required, the flow advances to step S212; if YES in step S209 (D<Th), the flow advances to step S210.

Step S210: The CPU 101 gives the driver a voice guidance indicating the start of display of the infrared ray image prior using the voice output unit 50 prior to the start of display of the infrared ray image.

Step S211: The CPU 101 checks if the delay time T set in step S206 has elapsed from the voice output timing in step S210. If YES in step S211 (the delay time T has elapsed), the flow advances to step S213 to start display of the infrared ray image; if NO in step S211 (the delay time T is being measured), the flow advances to step S212 to turn off display of the infrared ray image.

Step S212: The CPU 101 stops or inhibits display of the infrared ray image on the display 48, and the flow returns.

Step S213: The CPU 101 starts or continues display of the infrared ray image on the display 48, and the flow returns.

According to this embodiment mentioned above, even when no obstacle is present ahead of the vehicle, if it is estimated based on the operation state of the fog lamp switch 53 or wiper switch 46 that-visibility in the forward direction is poor, the infrared ray image is automatically displayed. On the other hand, when an obstacle is present, the ON/OFF state of display of the infrared ray image is adequately controlled in accordance with the distance D to that obstacle. Hence, driving assistance corresponding to the maneuvering environment can be adequately offered without disturbing the driver.

In this embodiment, when it is determined that an infrared ray image must be displayed, the voice output unit 50 outputs a voice guidance indicating that display is to be started prior to the beginning of the display, so the driver can be prevented from taking fright when display of the infrared ray image on the display 48 starts suddenly.

Furthermore, since the display start threshold value Th and delay time T used as references in determining if display of the infrared ray image is started use optimal values corresponding to the detected vehicle velocity or the like, flexible display control can be done adequately.

[10th Embodiment]

The 10th embodiment, which is based on the aforementioned display apparatus for a vehicle according to the ninth embodiment, will be explained below. In the following description, an explanation of the same arrangement as that in the ninth embodiment will be omitted, and a characteristic feature of this embodiment will be mainly explained.

Figure 27:
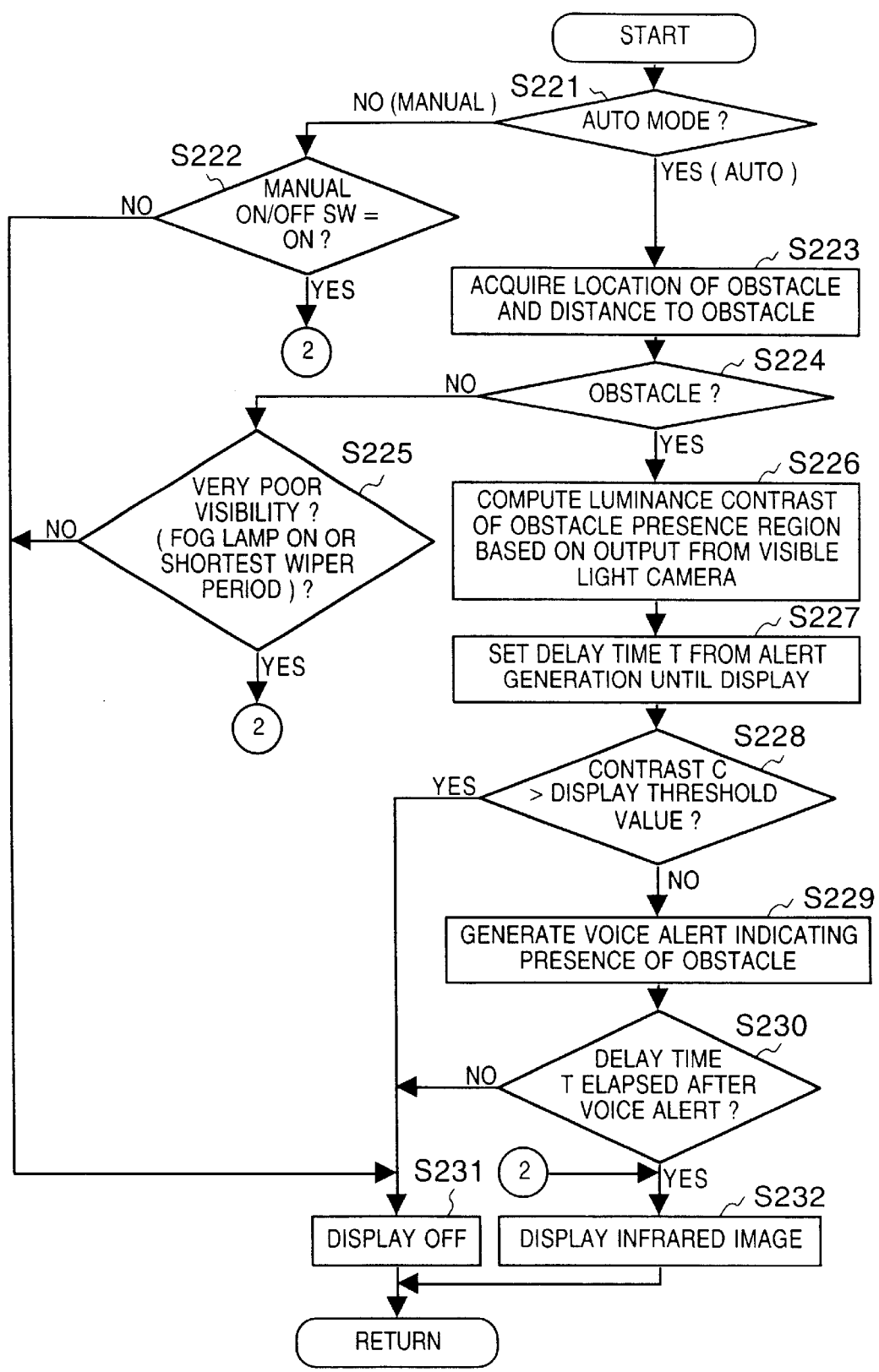
FIG. 27 is a flow chart of a display control processing by a display apparatus for a vehicle according to the 10th embodiment of the present invention.

FIG. 27 is a flow chart of a display control processing by the display apparatus for a vehicle according to the 10th embodiment, and shows the sequence of software executed by the CPU 101 while the ignition key switch of the vehicle is ON, and the power switch 52 is ON.

Referring to FIG. 27, the processing in steps S221 and S222 are the same as those in steps S201 and S202 in the ninth embodiment (FIG. 26).

Steps S223 and S224: The CPU 101 obtains the locations of obstacles ahead of the vehicle and distances D between those obstacles and the vehicle by acquiring data corresponding to the output signal from the obstacle sensor 42 (step S223), and checks if the acquired data contains information (location and distance D) representing the presence of an obstacle (step S224). If NO in step S224 (presence of an obstacle), the flow advances to step S225; if YES in step S224 (absence of an obstacle), the flow advances to step S226.

Step S225: The CPU 101 checks visibility in the forward direction as in step S208 in the ninth embodiment (FIG. 26). If it is determined that the visibility is poor, the flow advances to step S232; otherwise, the flow advances to step S231.

Step S226: The CPU 101 sets a presence region of the obstacle in an image sensed by the visible light camera 47

(to be referred to as a visible light image hereinafter) by associating the obstacle, the presence of which is detected based on the data corresponding to the output signal from the obstacle sensor 42 in step S224, and an image portion corresponding to the obstacle in the visible light image, and computes a luminance contrast C of the set obstacle presence region.

Note that the visible light image is digital multi-valued image data output from the visible light camera 47 itself or generated by an input interface (not shown) in the display controller 41 to which the visible light camera 47 is connected.

A method of setting the obstacle presence region in the visible light image will be explained below.

Figure 28:
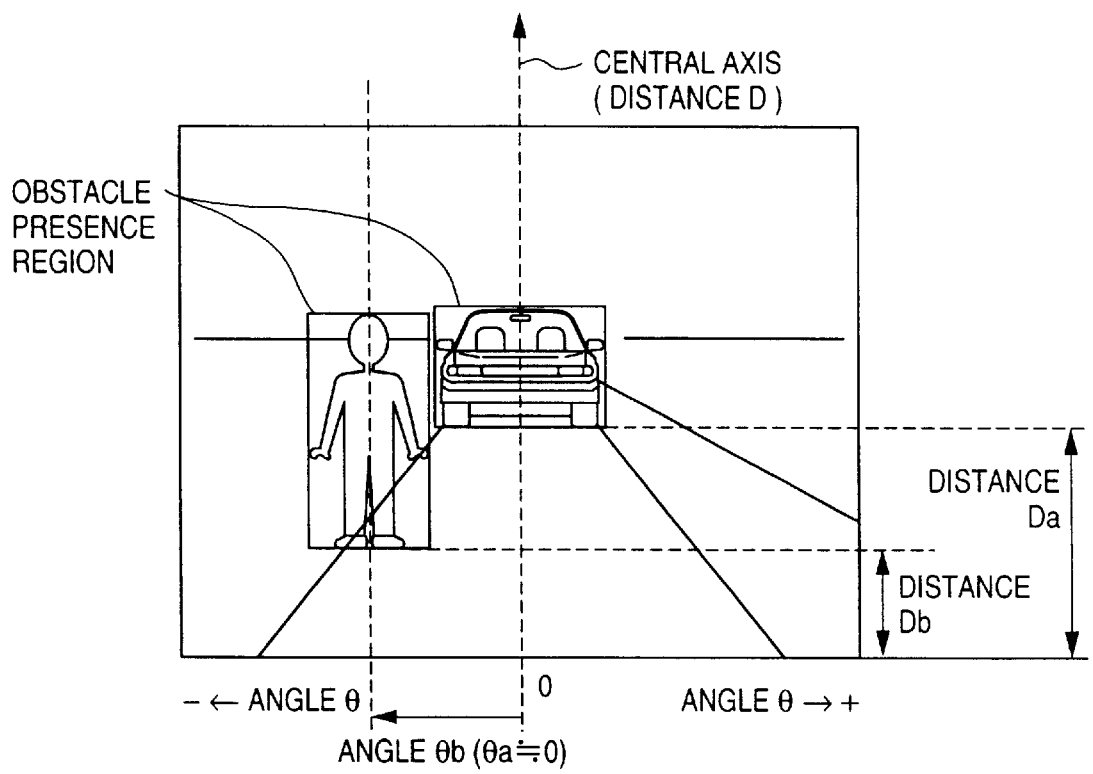
FIG. 28 shows an example of an image sensed by a visible light camera 47, and a coordinate axis set for that image.

FIG. 28 shows an example of an image sensed by the visible light camera 47, and the coordinate axis set on that image. In this embodiment as well, the top view of the detection range of the obstacle sensor 42 is the same as FIG. 4 in the first embodiment, and that detection range includes obstacle A (another leading vehicle) and obstacle B (pedestrian), which correspond to the sensed image output from the visible light camera 47 shown in FIG. 28.

Also, in this embodiment, the detection results of obstacles A and B by the obstacle sensor 42 are obtained as a distance Da between the vehicle and obstacle A and an angle θa ($\approx$0) obstacle A makes with the central axis, and a distance Db between the vehicle and obstacle B and an angle θb obstacle B makes with the central axis.

Therefore, when the position relationship between the central axis of the detection range of the obstacle sensor 42, and the coordinate axis of the image sensing surface (field angle) of the visible light camera 47 is determined in advance in correspondence with each other, the distance D to an obstacle output from the obstacle sensor 42 is counted as the number of lines (the number of pixels) from the lower side of the image sensing surface, and the angle θ is counted as the number of pixels from the central line in the horizontal direction of the image sensing surface. As a result, that pixel (pixel group) in the image sensing surface, which is specified by these counts, can be determined to correspond to the entire shape of an obstacle detected by the obstacle sensor 42.

Therefore, if such processing is done, the obstacle contained in the sensed image from the visible light camera 47 can be associated with the distance D to that obstacle, and when a rectangle including the pixel group that forms the obstacle is also set on the coordinate system of the corresponding coordinate axis, the obstacle detection region included in the visible light image can be set in the display controller 41.

An example of the method of computing the contrast C of the obstacle detection region set in this way will be explained below.

Figure 29:
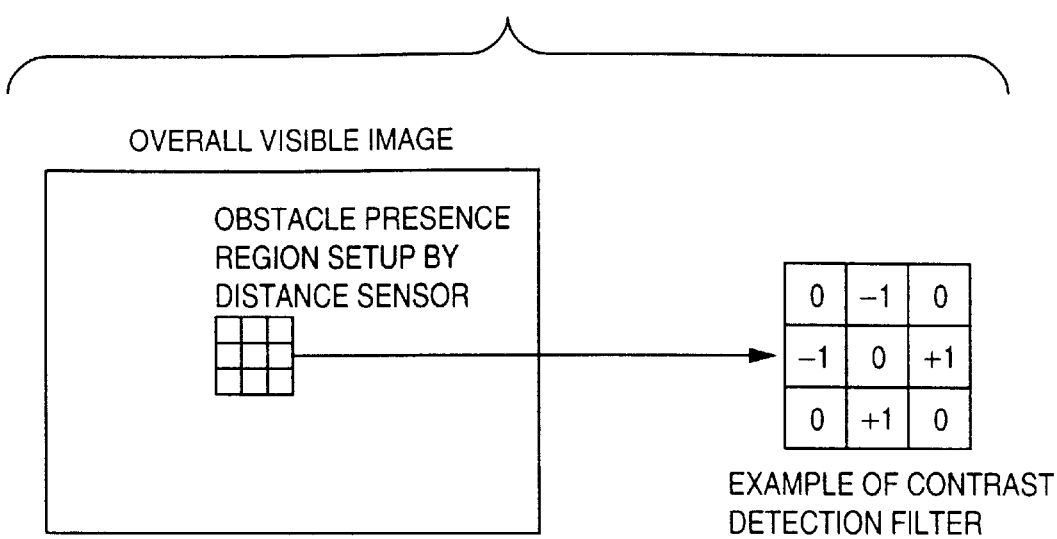
FIG. 29 shows an example of a contrast detection filter.

A visible light image as digital multi-valued image data consisting of M×N (M and N are natural numbers) pixels undergoes a so-called edge detection processing using a contrast detection filter (3×3 pixel matrix) shown in, e.g., FIG. 29, thus computing the contrast values of pixels that form the visible light image. Of the computed contrast values, a sum total of the contrast values of pixels which form an image region (obstacle presence region) that contains the image of the obstacle is computed, thus obtaining the contrast C of the obstacle detection region.

Step S227: The CPU 101 sets a delay time T as in step S206 in the ninth embodiment (FIG. 26).

Step S228: The CPU 101 checks if the contrast c computed in step S226 is larger than a predetermined display threshold value Tha. If YES in step S228 (C>Tha), since it is estimated that the contrast between the obstacle included in the visible right image and its surrounding region is high, and the visibility is high enough for the driver to visibly confirm the presence of the obstacle when he or she looks ahead of the vehicle, the flow advances to step S231 to stop display of the infrared ray image. Conversely, if NO in step S228 (C≦Tha), since it is determined that the driver can hardly recognize the presence of the obstacle due to low contrast when he or she looks ahead of the vehicle, i.e., visibility in the forward direction is poor, the flow advances to the processing in step S229 and subsequent steps to start or continue display of the infrared ray image.

Steps S229 to S232: The CPU 101 executes the same processing as those in steps S210 to S213 in the ninth embodiment (FIG. 26).

According to this embodiment mentioned above, even when no obstacle is present ahead of the vehicle, if it is estimated based on the operation state of the fog lamp switch 53 or wiper switch 46 that visibility in the forward direction is poor, the infrared ray image is automatically displayed. On the other hand, when an obstacle is present, the contrast C of the obstacle contained in the visible light image from the visible light camera 47 is computed and visibility in the forward direction is estimated as a maneuvering environment on the basis of the computation result, and the ON/OFF state of display of the infrared ray image is adequately controlled in accordance with the computation result. Hence, driving assistance corresponding to the maneuvering environment can be adequately offered without distracting the driver.

In this embodiment as well, when it is determined that an infrared ray image must be displayed, the voice output unit 50 outputs a voice guidance indicating that display is to be started prior to the beginning of the display, and the driver can be prevented from taking fright when display of the infrared ray image on the display 48 starts all of a sudden.

[11th Embodiment]

The 11th embodiment, which is based on the aforementioned display apparatus for a vehicle according to the ninth embodiment, will be explained below. In the following description, an explanation of the same arrangement as that in the ninth embodiment will be omitted, and a characteristic feature of this embodiment will be mainly explained.

Figure 30:
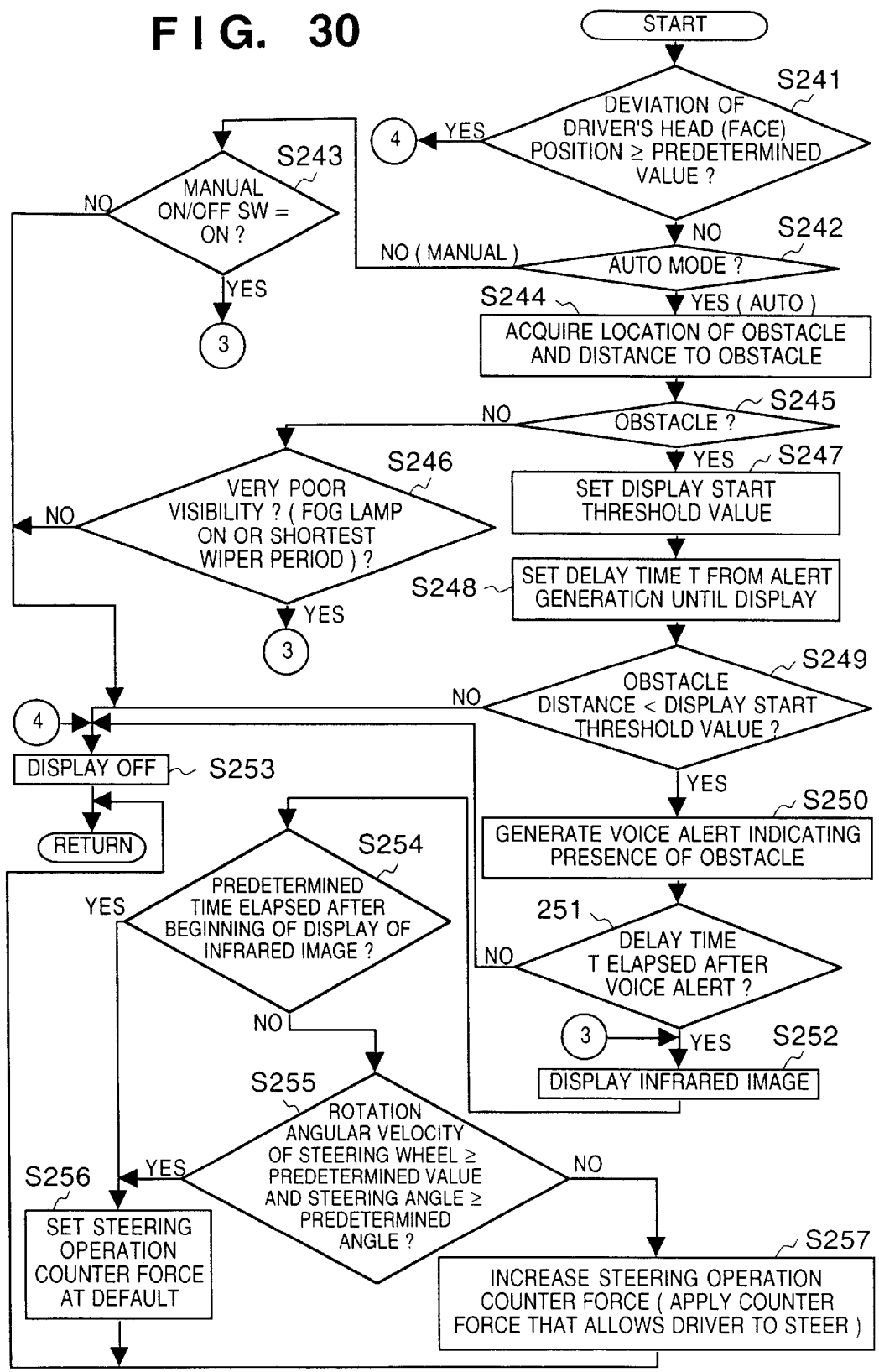
FIG. 30 is a flow chart of a display control processing by a display apparatus for a vehicle according to the 11th embodiment of the present invention.

FIG. 30 is a flow chart of a display control processing by the display apparatus for a vehicle according to the 11th embodiment, and shows the sequence of software executed by the CPU 101 while the ignition key switch of the vehicle is ON, and the power switch 52 is ON.

Step S241 in FIG. 30: The CPU 101 checks based on the output signal from the head/face position detection unit 44 if the direction (deviation) of the head/face of the driver is equal to or larger than a predetermined value, thus determining if the driver looks ahead of the vehicle or aside (inattentively). The method of detecting the head/face position of the driver using the output signal from the head/face position detection unit 44 which comprises the near infrared light camera 44a and infrared projector 44b is a state-of-the-art technique, and a detailed description thereof will be omitted. The detection method will be briefly explained below.

Figure 31A:
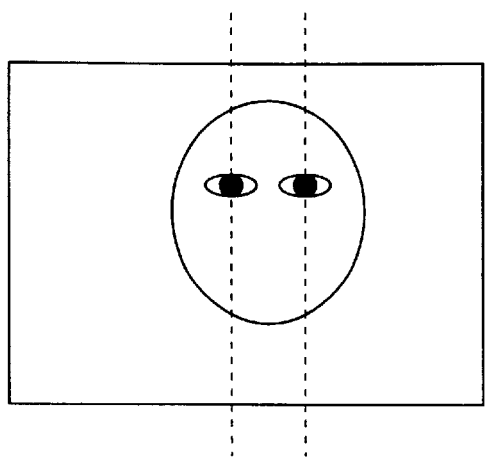
FIGS. 31A and 31B are views for explaining a method of detecting the driver's face direction by a head/face position detection unit 44 in the 11th embodiment.
Figure 31B:
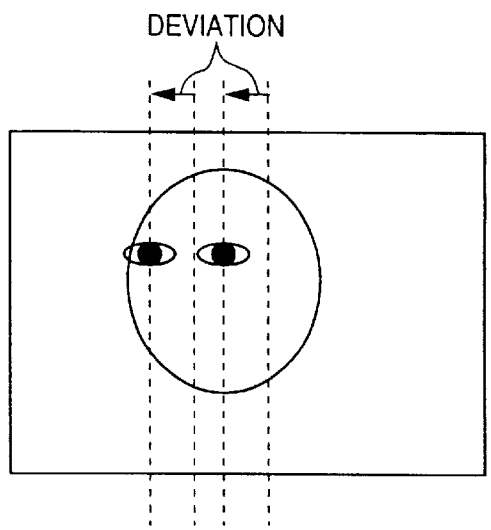

FIGS. 31A and 31B are views for explaining the method of detecting the head/face direction of the driver by the head/face position detection unit 44 in the 11th embodiment.

FIGS. 31A and 31B show an image of the head/face of the driver irradiated with light projected from the infrared projector 44b, which is sensed by the near infrared light camera 44a. FIG. 31A shows a case wherein the driver gazes forward, and FIG. 31B shows a case wherein the driver looks aside (inattentively).

As an example of the detection method, when an image of the head/face of the driver irradiated with light projected from the infrared projector 44b is sensed by the near infrared light camera 44a, since the pupil portions of the driver are sensed bright due to cornea reflection, the pupil positions (FIG. 31A) when the driver looks forward are stored as the reference positions. Then, deviations L of the pupil positions with respect to the stored reference positions are detected, and if the deviations L have exceeded a predetermined value, it can be determined that the driver looks aside.

As the method of setting the reference positions, the sensed image signal output from the near infrared light camera 44a undergoes a known binarization processing or feature point extraction processing to extract an image of the head/face portion of the driver, and pupil positions which are located nearly symmetrically in the extracted image of the head/face portion, as shown in FIG. 31A, can be detected as the reference positions when the driver looks ahead.

If YES in step S241 (the driver looks aside), the flow advances to step S253 to stop display of an infrared ray image (an image ahead of the vehicle sensed by the infrared light camera 43); if NO in step S241 (the driver looks forward), the flow advances to step S242.

Steps S242 and S243: The processing in steps S242 and S243 are the same as those in steps S201 and S202 in the ninth embodiment (FIG. 26).

Step S244: The CPU 101 obtains the locations of obstacles ahead of the vehicle and distances D between those obstacles and the vehicle by acquiring data corresponding to the output signal from the obstacle sensor 42 as in step S205 in the ninth embodiment (FIG. 26).

Step S245: The CPU 11 checks if the data corresponding to the output signal from the obstacle sensor 42 acquired in step S244 includes information (location and distance D) that represents the presence of an obstacle. If NO in step S245 (absence of an obstacle), the flow advances to step S246; if YES in step S245, the flow advances to step S247, as in step S207 in the ninth embodiment (FIG. 26).

Step S246: The CPU 101 checks visibility in the forward direction as in step S208 in the ninth embodiment (FIG. 26). If it is determined that the visibility in the forward direction is not good, the flow advances to step S252 to start or continue display of the infrared ray image; otherwise, the flow advances to step S253 to stop display of the infrared ray image.

Steps S247 and S248: The CPU 101 sets a display start threshold value Th and delay time T as in steps S204 and S206 in the ninth embodiment (FIG. 26).

Steps S249 to S253: The CPU 101 stops display of the infrared ray image or outputs a voice guidance prior to start of display of the infrared ray image in accordance with the set display start threshold value Th, and then starts display of the infrared ray image after an elapse of the delay time T, as in the processing in steps S209 to S213 in the ninth embodiment (FIG. 26).

In steps S254 to S257, the CPU 101 controls the steering counter torque adjustment unit 49 to generate a counter torque for a predetermined period of time after the start of display, so as to prevent the driver from taking fright (being disturbed) and making unwanted steering operation by starting display of the infrared ray image on the display 48. More specifically, the assist amount of the power steering system may be decreased or a rotation torque in a direction opposite to the steering direction of the driver may be given.

Steps S254 and S256: More specifically, the CPU 101 checks if a predetermined time has elapsed after the beginning of display of the infrared ray image on the display 48. If YES in step S254 (the predetermined time has elapsed after the beginning of display), the magnitude of a counter torque is set at a default value in step S256.

Steps S255 and S257: Since it is determined in step S254 that the predetermined time has not elapsed yet after the beginning of display, the CPU 101 checks based on the output signal from the steering angle sensor 55 if the rotation angular velocity of the steering wheel by the driver is equal to or higher than a predetermined angular velocity, and the steering angle is equal to or larger than a predetermined angle. Note that the rotation angular velocity can be obtained by computing a change in output signal from the steering angle sensor 55 per unit time.

If it is determined that the rotation angular velocity of the steering wheel is equal to or higher than the predetermined angular velocity and the steering angle is equal to or larger than the predetermined angle (YES in step S255), since the driver is steering the steering wheel, and it is not preferable to increase the steering counter torque during such operation, the magnitude of the counter torque is set at a default value in step S256.

On the other hand, if it is determined that the rotation angular velocity of the steering wheel is lower than the predetermined angular velocity and/or the steering angle is smaller than the predetermined angle (NO in step S255), the steering counter torque adjustment unit 49 increases the magnitude of the counter torque required upon steering to make the driver's steering operation harder.

At this time, the magnitude of the counter torque generated by the steering counter torque adjustment unit 49 preferably increases in proportion to an increase in vehicle velocity detected by the vehicle velocity sensor 45. For example, a map (table) that pre-stores such characteristics can be looked up in this step in accordance with the vehicle velocity.

According to this embodiment, in addition to the same effects as in the ninth embodiment, when the head/face position detection unit 44 determines that the driver looks aside, display of the infrared ray image on the display 48 is stopped. In this manner, driving assistance corresponding to the maneuvering environment can be adequately offered.

When display of an infrared ray image is started when the driver gazes forward, as the steering counter torque adjustment unit 49 generates a counter torque for a predetermined period of time to make the steering wheel heavy, the driver can be prevented from taking fright and abruptly steering the steering wheel due to start of the infrared ray image on the display 48.

The aforementioned 11th embodiment is particularly effective when the display 48 displays an infrared ray image sensed by the infrared light camera 43 at a position in front of the driver in a see-through state.

That is, in such see-through display, the driver recognizes the infrared ray image sensed by the infrared light camera, which overlaps the actual landscape ahead of the vehicle.

In this case, even while the driver is looking aside, if the infrared ray image is kept displayed on the display, the driver is distracted. However, according to embodiment, when it is determined that the driver looks aside, display of the infrared ray image on the display 48 is stopped, thus preventing the driver from feeling distracted.

Furthermore, in this embodiment, when it is detected that the driver gazes forward, since a voice guidance is output prior to display of the infrared ray image and the steering counter torque adjustment unit 49 is controlled to increase the steering force required for steering the steering wheel for a predetermined period of time after the beginning of display, operability and safety can be further improved when a see-through display is used as the display 48.

As many apparently widely different embodiments of the present invention can be made without departing from the spirit and scope thereof, it is to be understood that the invention is not limited to the specific embodiments thereof except as defined in the appended claims.

What is claimed is:

1. A display apparatus for a vehicle comprising:
   an image sensing device for sensing an image of a landscape ahead of the vehicle using infrared rays;
   a display for displaying the image sensed by said image sensing device at a position in front of a driver's seat of the vehicle;
   distance detection means for detecting an obstacle present ahead of the vehicle on the basis of the image sensed by said image sensing device, and detecting a distance between the obstacle and the vehicle on the basis of the sensed image; and
   display control means for processing the sensed image in accordance with a detection result of said distance detection means and displaying the processed image on said display,
   wherein said display control means executes a predetermined image processing of the image sensed by said image sensing device so as to display only the obstacle with the shortest detected distance to the vehicle, and displays an image that has undergone the image processing on said display.

2. A display apparatus for a vehicle comprising:
   an image sensing device for sensing an image of a landscape ahead of the vehicle using infrared rays;
   a display for displaying the image sensed by said image sensing device at a position in front of a driver's seat of the vehicle;
   distance detection means for detecting an obstacle present ahead of the vehicle on the basis of the image sensed by said image sensing device, and detecting a distance between the obstacle and the vehicle on the basis of the sensed image; and
   display control means for processing the sensed image in accordance with a detection means and displaying the processed image on said display,
   wherein said display control means executes a predetermined image processing of the sensed image so as to emphasize and display the obstacle with the shortest detected distance to the vehicle compared to other obstacles, and displays an image that has undergone the image processing on said display.

3. A display apparatus for a vehicle comprising:
   an image sensing device for sensing an image of a landscape ahead of the vehicle using infrared rays;
   a display for displaying the image sensed by said image sensing device at a position in front of a driver's seat of the vehicle;
   distance detection means for detecting an obstacle present ahead of the vehicle on the basis of the image sensed by said image sensing device, and detecting a distance between the obstacle and the vehicle on the basis of the sensed image; and
   display control means for processing the sensed image in accordance with a detection result of said distance detection means and displaying the processed image on said display,
   wherein said display control means extracts a partial image that represents the obstacle with the shortest detected distance to the vehicle from the sensed image, executes a predetermined image processing for enlarging the extracted partial image, and displays an image that has undergone the image processing on said display.

4. A display apparatus for a vehicle comprising:
   an image sensing device for sensing an image of a landscape ahead of the vehicle using infrared rays;
   a display for displaying the image sensed by said image sensing device at a position in front of a driver's seat of the vehicle;
   distance detection means for detecting an obstacle present ahead of the vehicle on the basis of the image sensed by said image sensing device, and detecting a distance between the obstacle and the vehicle on the basis of the sensed image; and
   display control means for processing the sensed image in accordance with a detection result of said distance detection means and displaying the processed image on said display,
   wherein said display control means extracts a partial image that represents a person from the image sensed by said image sensing device, executes image processing of the sensed image so as to emphasize and display the partial image that represents the person with the shortest detected distance to the vehicle compared to partial images representing other obstacles, and displays an image that has undergone the image processing on said display.

5. The apparatus according to claim 4, wherein said display control means determines an obstacle, a radiation temperature of which falls within a predetermined temperature range, to be a person on the basis of radiation temperatures of obstacles included in the sensed image, prior to extraction of the partial image that represents the person from the sensed image.

6. The apparatus according to claim 4, wherein said display control means selects a predetermined number of the detected distances between the vehicle and persons corresponding to the partial images in ascending order of distance to the vehicle, and emphasizes and displays the partial images that represent the persons corresponding to the selected distances compared to the partial images that represent the other obstacles, as the predetermined image processing.

7. A display apparatus for a vehicle comprising:
   an image sensing device for sensing an image of a landscape ahead of the vehicle using infrared rays;
   a display for displaying the image sensed by said image sensing device at a position in front of a driver's seat of the vehicle;
   distance detection means for detecting an obstacle present ahead of the vehicle on the basis of the image sensed by said image sensing device, and detecting a distance between the obstacle and the vehicle on the basis of the sensed image; and
   display control means for processing the sensed image in accordance with a detection result of said distance detection means and displaying the processed image on said display,
   wherein said display control means executes a predetermined image processing of the image sensed by said image sensing device so as to display a partial image which represents the obstacle with the shortest detected distance to the vehicle in said display, and also displays the distance to the vehicle detected in association with that obstacle near the partial image.

8. A display apparatus for a vehicle comprising:
   an image sensing device for sensing an image of a landscape ahead of the vehicle using infrared rays;

a display for displaying the image sensed by said image sensing device at a position in front of a drivers seat of the vehicle;

distance detection means for detecting an obstacle present ahead of the vehicle on the basis of the image sensed by said image sensing device, and detecting a distance between the obstacle and the vehicle on the basis of the sensed image; and display control means for processing the sensed image in accordance with a detection result of said distance detection means and displaying the processed image on said display, wherein said display control means extracts a partial image that represents a corresponding obstacle when each of the detected distances is larger than a first predetermined distance, executes a predetermined image processing for enlarging the extracted partial image, and displays an image that has undergone the image processing on said display.

9. The apparatus according to claim 8, further comprising:
vehicle velocity detection means for detecting a vehicle velocity of the vehicle,
wherein said display control means makes enlarged-scale display of the partial image easier with increasing vehicle velocity of the vehicle upon executing the predetermined image processing.

10. The apparatus according to claim 8, further comprising:
turn state detection means for detecting a turn state of the vehicle,
wherein said display control means inhibits execution of enlarged-scale display of the partial image when said turn state detection means detects that the vehicle is turning.

11. The apparatus according to claim 8, further comprising:
turn state detection means for detecting a turn state of the vehicle,
wherein, when said turn state detection means detects that the vehicle is turning and it is determined that an obstacle located at a position closer than the first predetermined distance is approaching along an estimated route of the vehicle, said display control means makes enlarged-scale display of a partial image which represents that obstacle, and when said turn state detection means detects that the vehicle is not turning, said display control means inhibits execution of enlarged-scale display of the partial image.

12. The apparatus according to claim 8, wherein said display control means also displays a symbol mark which informs a passenger of enlarged-scale display when the partial image is displayed in an enlarged scale.

13. The apparatus according to claim 8, further comprising:
maneuvering environment detection means for detecting a value that pertains to visibility of a driver with respect to a maneuvering environment ahead of the vehicle as a maneuvering environment of the vehicle,
wherein said display control means corrects the first predetermined distance to increase as the detection result of said maneuvering environment detection means indicates worse visibility.

14. A display apparatus for a vehicle, which is provided to a vehicle, comprising:
an image sensing device for sensing an image of a landscape ahead of the vehicle using infrared rays;
a display for displaying the image sensed by said image sensing device at a position in front of a driver's seat of the vehicle;

distance detection means for detecting an obstacle present ahead of the vehicle, and detecting a distance between the obstacle and the vehicle; and display control means for changing a display mode of said display in accordance with a detection result of said distance detection means;
wherein said display control means computes distances between the vehicle and obstacles included in an overall image sensed by said image sensing device on the basis of that overall image and the detection result from said distance detection means,
displays an image obtained by deforming a partial image that represents a given obstacle on said display when the computed distance to that obstacle is larger than a first predetermined distance, so as to make a driver easily recognize the presence of the corresponding obstacle, and
displays the overall image on said display when the computed distance is smaller than the first predetermined distance.

15. A display apparatus for a vehicle, which is provided to a vehicle, comprising:
an image sensing device for sensing an image of a landscape ahead of the vehicle using infrared rays;
a display for displaying the image sensed by said image sensing device at a position in front of a driver's seat of the vehicle;
distance detection means for detecting an obstacle present ahead of the vehicle, and detecting a distance between the obstacle and the vehicle; and display control means for changing a display mode of said display in accordance with a detection result of said distance detection means;
wherein said display control means computes distances between the vehicle and obstacles included in an overall image sensed by said image sensing device on the basis of that overall image and the detection result from said distance detection means,
displays the overall image on said display when the computed distance is smaller than a second predetermined distance, and
stops display of the overall image on said display when the computed distance is larger than the second predetermined distance.

16. The apparatus according to claim 15, further comprising:
vehicle velocity detection means for detecting a vehicle velocity of the vehicle,
wherein said display control means changes the second predetermined distance to increase with increasing vehicle velocity of the vehicle.

17. The apparatus according to claim 15, further comprising:
maneuvering environment detection means for detecting a value that pertains to visibility of a driver with respect to a maneuvering environment ahead of the vehicle as a maneuvering environment of the vehicle,
wherein said display control means corrects the second predetermined distance to increase as the detection result of said maneuvering environment detection means indicates worse visibility.

18. The apparatus according to claim 15, further comprising alert means for informing a passenger of start of display by means of a voice message prior to display of the overall image.

* * * * *